United States Patent
Yu et al.

(10) Patent No.: US 12,126,836 B2
(45) Date of Patent: Oct. 22, 2024

(54) PICTURE PREDICTION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Yuanfang Yu, Guangdong (CN); Yang Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/646,222

(22) Filed: Dec. 28, 2021

(65) Prior Publication Data
US 2022/0191548 A1 Jun. 16, 2022

Related U.S. Application Data

(63) Continuation of application No. PCT/CN2020/090665, filed on May 15, 2020.
(Continued)

(51) Int. Cl.
H04N 19/70 (2014.01)
H04N 19/159 (2014.01)
(Continued)

(52) U.S. Cl.
CPC .......... *H04N 19/70* (2014.11); *H04N 19/159* (2014.11); *H04N 19/176* (2014.11); *H04N 19/186* (2014.11)

(58) Field of Classification Search
CPC .... H04N 19/70; H04N 19/159; H04N 19/176; H04N 19/186
(Continued)

(56) References Cited

U.S. PATENT DOCUMENTS 11,134,257 B2 * 9/2021 Zhao ................... H04N 19/593
11,290,736 B1 * 3/2022 Wang .................... H04N 19/50
(Continued)

FOREIGN PATENT DOCUMENTS

CA 3137181 A1 * 10/2020 ........... H04N 19/119
CN 103096051 A 5/2013
(Continued)

OTHER PUBLICATIONS

Choi, et al., Joint Video Experts Team (JVET)—of ITU-T SG 16 WP 3 and ISO/IEC JTC 1/SC 29/WG 11—15th Meeting: Gothenburg, SE, Jul. 3-12, 2019—Non-CE3: MIP mode reduction (9 pages).
(Continued)

*Primary Examiner* — Albert Kir
(74) *Attorney, Agent, or Firm* — PERKINS COIE LLP

(57) ABSTRACT

Provided in the present application are a picture prediction method, encoder, decoder and storage medium. If a current block uses an MIP mode to determine its intra prediction value, the encoder sets a value of an MIP mode parameter as indicating use of the MIP mode and signals into a bitstream; determines the MIP mode of the current block and signals into the bitstream; determines, based on the MIP mode, prediction values for luma and chroma components of the current block. The decoder parses the bitstream and determines an MIP mode parameter of the current block; if its value indicates that the current block uses the MIP mode to determine its intra prediction value, parses the bitstream, determines the MIP mode of the current block and prediction values of luma and chroma components of the current block based on the MIP mode; decodes the current block based on prediction values.

16 Claims, 6 Drawing Sheets

Related U.S. Application Data

(60) Provisional application No. 62/871,177, filed on Jul. 7, 2019.

(51) Int. Cl.
  *H04N 19/176* (2014.01)
  *H04N 19/186* (2014.01)
  *H04N 19/593* (2014.01)

(58) Field of Classification Search
  USPC .................................................... 375/240.26
  See application file for complete search history.

(56) References Cited

U.S. PATENT DOCUMENTS

| | | | |
|---|---|---|---|
| 11,290,737 B2 * | 3/2022 | Lee | H04N 19/91 |
| 2016/0227251 A1 | 8/2016 | Lee et al. | |
| 2020/0322620 A1 * | 10/2020 | Zhao | H04N 19/186 |
| 2020/0322623 A1 * | 10/2020 | Chiang | H04N 19/46 |
| 2020/0344468 A1 * | 10/2020 | Lin | H04N 19/176 |
| 2020/0359037 A1 * | 11/2020 | Ramasubramonian | H04N 19/85 |
| 2020/0389671 A1 * | 12/2020 | Zhao | H04N 19/119 |
| 2020/0396455 A1 * | 12/2020 | Liu | H04N 19/593 |
| 2020/0404324 A1 * | 12/2020 | Pham Van | H04N 19/593 |
| 2020/0404325 A1 * | 12/2020 | Ramasubramonian | H04N 19/11 |
| 2021/0067803 A1 * | 3/2021 | Li | H04N 19/176 |
| 2021/0092405 A1 * | 3/2021 | Biatek | H04N 19/70 |
| 2021/0297672 A1 * | 9/2021 | Deng | H04N 19/70 |
| 2022/0116606 A1 * | 4/2022 | Pfaff | H04N 19/12 |
| 2022/0224922 A1 * | 7/2022 | Wang | H04N 19/147 |

FOREIGN PATENT DOCUMENTS

| | | | | |
|---|---|---|---|---|
| CN | 107646195 | A | 1/2018 | |
| CN | 109891883 | A | 6/2019 | |
| CN | 110677655 | A | 1/2020 | |
| WO | 2019098464 | A1 | 5/2019 | |
| WO | 2020053394 | A1 | 3/2020 | |
| WO | WO-2021058640 | A1 * | 4/2021 | ............. H04N 19/11 |

OTHER PUBLICATIONS

Heo, et al., Joint Video Experts Team (JVET)—of ITU-T SG 16 WP 3 and ISO/IEC JTC 1/SC 29/WG 11—15th Meeting: Gothenburg, SE, Jul. 3-12, 2019—JVET-00351-v2—Non-CE3 : Clean-up intra type signaling (6 pages).
International Search Report issued Aug. 11, 2020 of PCT /CN2020/ 090665 (6 pages).
ITU-T H.265, Telecommunication Standardization Sector of ITU, Feb. 2018, Series H: Audiovisual and Multimedia Systems, Infrastructure of audiovisual services—Coding of moving video, 692 pages.
ITU-T H.265, Telecommunication Standardization Sector of ITU, Apr. 2015, Series H: Audiovisual and Multimedia Systems, Infrastructure of audiovisual services—Coding of moving video, 634 pages.
ITU-T H.265, Telecommunication Standardization Sector of ITU, Dec. 2016, Series H: Audiovisual and Multimedia Systems, Infrastructure of audiovisual services—Coding of moving video, 664 pages.
ITU-T H.265, Telecommunication Standardization Sector of ITU, Oct. 2014, Series H: Audiovisual and Multimedia Systems, Infrastructure of audiovisual services—Coding of moving video, 540 pages.
ITU-T H.265, Telecommunication Standardization Sector of ITU, Apr. 2013, Series H: Audiovisual and Multimedia Systems Infrastructure of audiovisual services—Coding of moving video, 317 pages.
ITU-T H.265 Telecommunication Standardization Sector of ITU Aug. 2021, Series H: Audiovisual and Multimedia Systems, Infrastructure of audiovisual services—Coding of moving video, 716 pages.
ITU-T H.265, Telecommunication Standardization Sector of ITU Nov. 2019, Series H: Audiovisual and Multimedia Systems, Infrastructure of audiovisual services—Coding of moving video, 712 pages.
ITU-T H.265, Telecommunication Standardization Sector of ITU, Jun. 2019, Series H: Audiovisual and Multimedia Systems, Infrastructure of audiovisual services—Coding of moving video, 696 pages.
Pfaff, et al., Joint Video Experts Team (JVET)—of ITU-T SG 16 WP 3 and ISO/IEC JTC 1/SC 29/WG 11—14th Meeting: Geneva, CH, Mar. 19-27, 2019—JVET-N0217—CE3: Affine linear weighted intra prediction (CE3-4.1, CE3-4.2) (29 pages).
Bross, Benjamin , et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001 v.10, 408 pages.
Bross, B et al. "Versatile Video Coding (Draft 5)" JVET-N1001-v8; JVET of ITU-T SG 16 WP 3 and ISO/IEC JTC 1/SC 29/WG 11. 14th Meeting; Geneva, CH; Mar. 19-27, 2019. 397 pages.
Examination Report for Indian Application No. 202117059131 issued Jun. 29, 2022. 5 pages with English translation.
Extended European Search Report for European Application No. 20837468.6 issued Jun. 29, 2022. 9 pages.
Fraunhofer HHI "CE3: Affine linear weighted intra prediction (CE3-4.1, CE3-4.2)" JVET-N0217; JVET of ITU-T SG 16 WP 3 and ISO/IEC JTC 1/SC 29/WG 11; 14th Meeting; Geneva, CH; Mar. 19-27, 2019. 17 pages.
Hearing notice of Indian application No. 202117059131 issued on Mar. 18, 2024, 2 pages.
Notice of Reasons for Refusal of Japanese application No. 2021-577825 issued on Mar. 29, 2024, 19 pages with English translation.
Toshihiko Suzuki's "Intra-frame coding and inter-frame predictive coding" published in the Journal of Video information media, vol. 67, No. 7, pp. 537 to 540 on Jul. 1, 2013, 13 pages with English translation.
First Office Action of the CN application No. 202210123294. 1,issued on Jul. 11, 2024. 15 pages with English translation.
Second Office Action of the ID application No. P00202111959,issued on Jun. 24, 2024. 3 pages with English translation.
Office Action of the JP application No. 2021-577825, issued on Aug. 30, 2024. 20 pages with English translation.
Wang Zhen-peng et al., Method to Realize the Part of Intra Prediction of AVS, issued on Aug. 1, 2007. 8 pages with English translation.

\* cited by examiner

PICTURE PREDICTION METHOD, ENCODER, DECODER, AND STORAGE MEDIUM

CROSS-REFERENCE TO RELATED APPLICATIONS

The present application is a continuation application of International PCT Application No. PCT/CN2020/090665, filed on May 15, 2020, which claims priority of U.S. provisional patent application No. 62/871,177, filed on Jul. 7, 2019, and entitled "Method, Apparatus, and System for Encoding and Decoding Video Data". The above-identified applications are hereby incorporated by reference in their entirety.

TECHNICAL FIELD

Embodiments of the present application relate to the field of video encoding and decoding technologies, in particular to a picture predication method, an encoder, a decoder, and a storage medium.

BACKGROUND

In a Versatile Video Coding (VVC) Test Model, a new intra coding technology, namely Matrix-based Intra Prediction (MIP), is proposed. The MIP is an intra prediction technology based on a neural network, i.e., for predicting a luma value of a current block by using a multilayer neural network based on neighbouring reconstructed luma blocks. Specifically, same as a conventional intra mode, when the MIP mode is used for intra prediction, an input of MIP prediction is also data of neighbouring luma blocks in an above row and a left column of the current block, and an output of the MIP prediction is a prediction value of a luma component of the current block. A specific prediction process is partitioned into three acts: downsampling, matrix vector multiplication, and interpolation.

However, due to high complexity of the MIP mode, while a MIP technology is used for improving encoding and decoding performance, a storage space and overall time required during an encoding and decoding process are also greatly increased, thereby reducing an encoding and decoding efficiency.

Summary

Embodiments of the present application provide a picture prediction method, an encoder, a decoder, and a storage medium, capable of reducing complexity and a storage space as well as overall time required in an encoding and decoding process on a basis of ensuring encoding and decoding performance, thus effectively improving an encoding and decoding efficiency.

Technical solutions of the embodiments of the present application are implemented as follows.

In a first aspect, an embodiment of the present application provides a picture prediction method, which is applied to an encoder, the method includes: setting a value of a Matrix-based Intra Prediction (MIP) mode parameter to be for indicating a MIP mode is used and signalling the value of the MIP mode parameter in a bitstream if a MIP mode is used for a current block to determine an intra prediction value of the current block; determining the MIP mode of the current block and determining prediction values of a luma component and a chroma component corresponding to the current block according to the MIP mode; and signalling the MIP mode of the current block in the bitstream.

In a second aspect, an embodiment of the present application provides a picture prediction method, which is applied to a decoder, the method includes: parsing a bitstream and determining a Matrix-based Intra Prediction (MIP) mode parameter of a current block; parsing the bitstream, determining a MIP mode of the current block and determining prediction values of a luma component and a chroma component corresponding to the current block according to the MIP mode if a value of the MIP mode parameter indicates that the MIP mode is used for the current block to determine an intra prediction value of the current block; and decoding the current block according to the prediction values.

In a third aspect, an embodiment of the present application provides an encoder, including: a setting part, a first determining part, and an encoding part, wherein the setting part is configured to set a value of a Matrix-based Intra Prediction (MIP) mode parameter to be for indicating a MIP mode is used and signal the value of the MIP mode parameter in a bitstream if the MIP mode is used for a current block to determine an intra prediction value of the current block; the first determining part is configured to determine the MIP mode of the current block and determine prediction values of a luma component and a chroma component corresponding to the current block according to the MIP mode; and the encoding part is configured to signal the MIP mode of the current block in the bitstream.

In a fourth aspect, an embodiment of the present application provides an encoder including a first processor and a first memory in which instructions executable for the first processor are stored, and when the instructions are executed by the first processor, the above picture prediction methods are implemented.

In a fifth aspect, an embodiment of the present application provides a decoder, including: a decoding part and a second determining part, wherein the decoding part is configured to parse a bitstream and determine a Matrix-based Intra Prediction (MIP) mode parameter of a current block; and parse the bitstream and determine a MIP mode of the current block if a value of the MIP mode parameter indicates that the MIP mode is used for the current block to determine an intra prediction value of the current block; the second determining part is configured to determine prediction values of a luma component and a chroma component corresponding to the current block according to the MIP mode; and the decoding part is further configured to decode the current block according to the prediction values.

In a sixth aspect, an embodiment of the present application provides a decoder including a second processor and a second memory in which instructions executable for the second processor are stored, and when the instructions are executed by the second processor, the above picture prediction methods are implemented.

In a seventh aspect, an embodiment of the present application provides a computer-readable storage medium, on which a program applied to an encoder and a decoder is stored, the above picture prediction methods are implemented when the computer program is executed by a first processor, or the above picture prediction methods are implemented when the computer program is executed by a second processor.

An embodiment of the present application provides a picture prediction method, an encoder, a decoder, and a storage medium. If a MIP mode is used for a current block to determine an intra prediction value of the current block, then a value of a MIP mode parameter is set to be for indicating the MIP mode is used, and signalled in a bitstream by an encoder; the encoder determines the MIP mode of the current block and determines prediction values of a luma component and a chroma component corresponding to the current block according to the MIP mode; and the MIP mode of the current block is signalled in the bitstream by the encoder. A decoder parses a bitstream and determines a MIP mode parameter of a current block; if a value of the MIP mode parameter indicates that a MIP mode is used for the current block to determine an intra prediction value of the current block, the decoder parses the bitstream, determines the MIP mode of the current block, and determines prediction values of a luma component and a chroma component corresponding to the current block according to the MIP mode; and the decoder decodes the current block according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine an intra prediction value of the current block. It may be seen that according to the picture prediction method provided in the present application, a syntax unit may be used for indicating whether a MIP mode is used for the current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

DETAILED DESCRIPTION

Figure 1:
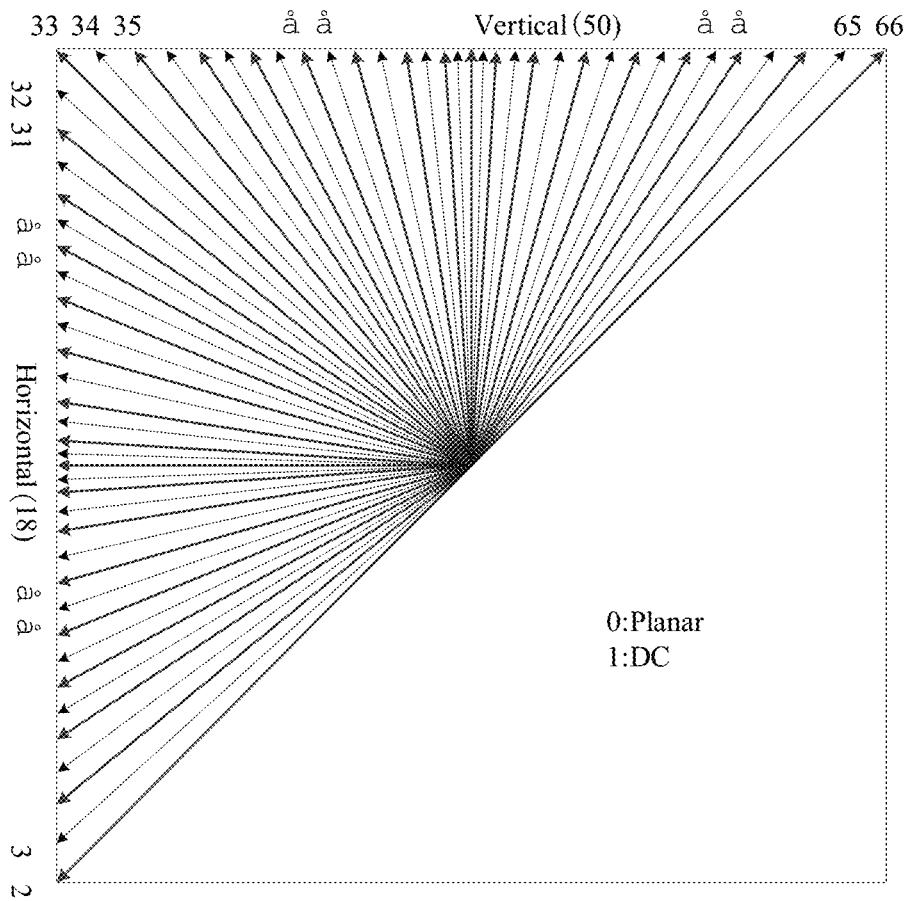
FIG. 1 is a schematic diagram of arrangement of 67 prediction modes in intra prediction.

Technical solutions in the embodiments of the present application will be clearly and completely described below in conjunction with the drawings in the embodiments of the present application. It may be understood that specific embodiments described herein are only intended to explain a relevant application, not limit the present application. In addition, it should also be noted that for convenience of description, only parts related to the relevant application are shown in the drawings.

At present, a standardization project namely Versatile Video Coding (VVC) initiated by the International Telecommunication Union-Transmission (ITU-T) and the International Organization for Standardization (ISO)/International Electrotechnical Commission (IEC) to develop a new-generation video coding standard, aiming at improving VVC performance by about 50% compared with the latest H.265/HEVC standard when encoding a high-quality video with one or more features of high resolution, high frame rate, high bit depth, high dynamic range, wide color gamut, and omnidirectional viewing angle. The Joint Video Experts Team (JVET) is in charge of this standardization project. Various intra prediction modes and inter prediction modes have been verified to achieve a high compression efficiency when encoding a high-quality video, so they are adopted in a VVC Working Draft.

In video pictures, an Affine Linear Weighted intra Prediction technology proposed in the Joint Video Experts Team (JVET)-N0217 has been accepted in VVC, and is renamed as a Matrix-based Intra Prediction, i.e., MIP, technology. In this technology, different quantities of matrix-based intra prediction modes are added in a process of intra luma prediction according to differences in sizes of intra luma coding blocks.

In order to capture a finer edge direction presented in a natural video, in VVC, 33 angular intra luma prediction modes defined in High Efficiency Video Coding (HEVC) is expanded to 65 angular intra luma prediction modes. FIG. 1 is a schematic diagram of arrangement of 67 prediction modes in intra prediction. As shown in FIG. 1, arrows numbered from 2 to 66 represent 65 angular intra prediction modes, and there are also two non-angular modes, i.e., a gradient planar mode numbered 0 and a direct current (DC) mode numbered 1. Therefore, an intra prediction process in VVC includes two non-angular modes and 65 angular modes. Here, these 67 prediction modes are called conventional intra prediction modes.

MIP is an intra prediction technology based on a neural network, i.e., predicting a luma value of a current block by using a multilayer neural network based on neighbouring reconstructed pixels. Specifically, in a MIP technology, luma coding blocks are partitioned into three types according to sizes of intra luma coding blocks. Assuming that a size of a luma coding block is W×H, wherein W is a width parameter and H is a height parameter, luma coding blocks may be partitioned into three types according to sizes of the luma coding blocks.

Luma coding blocks with a size of 4×4 are a first type of luma blocks, luma coding blocks with sizes of 8×4, 4×8, and 8×8 are a second type of luma blocks, and luma coding blocks with other sizes are a third type of luma blocks.

For these three types of intra luma coding blocks, in the MIP technology, M MIP modes are added on a basis of the 67 conventional intra prediction modes, wherein for the first type of luma blocks, M=16; for the second type of luma blocks, M=8; and for the third type of luma blocks, M=6.

Specifically, the MIP technology is only used for intra luma prediction, same as conventional modes, input of MIP prediction is also data in an above row and a left column of a current block, and output is a prediction value of the current block. A specific prediction process is partitioned into three acts: averaging, matrix vector multiplication, and interpolation. That is to say, by performing these three acts on input reconstructed luma values of neighbouring pixels in the above row and the left column, a prediction value of a luma component of the current block may be obtained.

Figure 2:
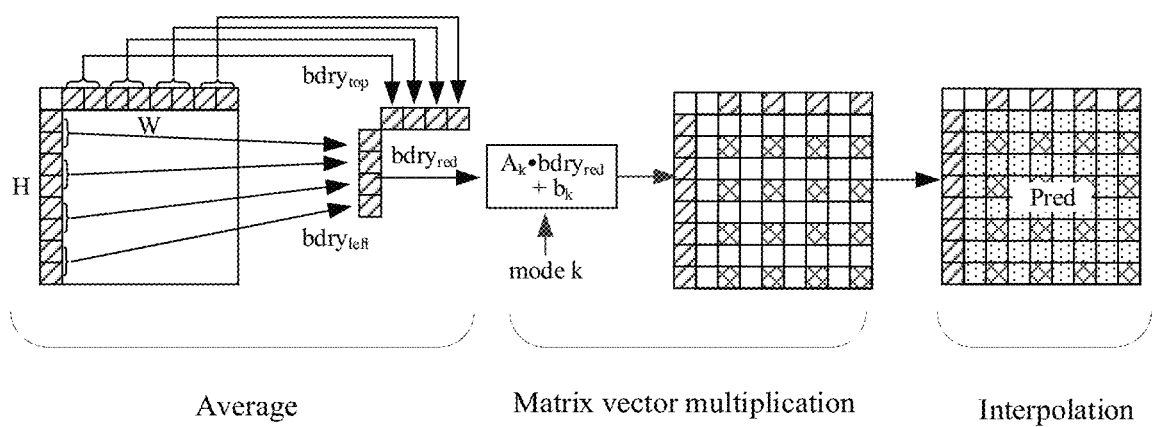
FIG. 2 is a schematic flow chart of encoding by using a MIP mode.

FIG. 2 is a schematic flow chart of encoding by using a MIP mode. As shown in FIG. 2, specific implementation of performing luma prediction by using the MIP mode is as follows.

In a first act, an averaging operation is performed on above neighbouring reference samples of a current block to obtain a vector bdry$_{top}$, having N values in total; and an averaging operation is performed on left neighbouring reference samples of the current block to obtain a vector bdry$_{left}$, having N values in total. When current luma encoding is a first type of luma encoding, N=2; and when the current luma encoding is a second type or a third type of luma encoding, N=4. The vector bdry$_{top}$ and the vector bdry$_{left}$ form a new vector bdry$_{red}$ for subsequent operations.

In a second act, a corresponding matrix $A_k$ and an offset $b_k$ are acquired through a mode number k of the MIP mode, and partial prediction values of the current block identified by crossed lines as shown in FIG. 2 are obtained through calculation with the following formula (1).

$$Pred_{red}=A_k \cdot bdry_{red}+b_k \quad (1)$$

In a third act, remaining prediction values Pred$_{red}$ in the current block are obtained through linear interpolation.

It should be noted that, in an implementation process of encoding a current block, which coding mode that is specifically used in intra prediction should be signalled in a compressed bitstream, so that a decoder may determine, by parsing mode information, which mode is specifically used, and whether the mode is a conventional mode or a MIP mode. If the mode is a conventional mode, which specific conventional mode is used is determined; and if the mode is a MIP mode, which specific MIP mode is used is determined.

In intra prediction of VVC, comparison of Rate Distortion cost (RDcost) between 67 conventional modes and M MIP modes is performed for each luma coding block, and an optimal mode is selected from the 67 conventional modes and the M MIP modes for encoding. In order to save bit overhead, a Most Probable Modes List (MPM)-based intra mode coding technology is used in VVC.

It should be noted that since an extend reference line technology and an Intra Sub-Partitionar (ISP) technology are only used for modes in a MPM list, when both extendrefflag and ispflag are 0, i.e., when zero reference line is used and no sub-block partitioning is performed, there is no need to encode mpmflag, and a position of the optimal mode in the MPM list is directly encoded.

Further, with regard to construction of the MPM list and MIPMPM list, in luma intra prediction of VVC, if an optimal mode selected for the current block is a conventional mode, an MPM list containing six most probable conventional modes needs to be constructed. If an optimal mode selected by the current block is a MIP mode, a MIPMPM list containing three most probable MIP modes needs to be constructed.

Figure 3:
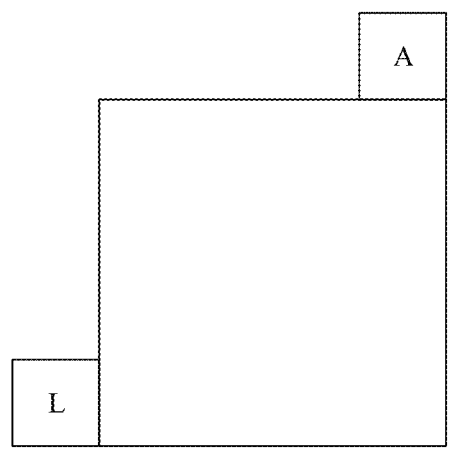
FIG. 3 is a schematic diagram of arrangement of an above neighbouring luma block and a left neighbouring luma block of a current block.

FIG. 3 is a schematic diagram of arrangement of an above neighbouring luma block and a left neighbouring luma block of a current block. As shown in FIG. 3, the two lists mentioned above are both derived according to the optimal modes of the above neighbouring luma block (A) and the left neighbouring luma block (L) of the current block as shown in FIG. 3.

Specifically, for construction of an MPM list, in VVC intra prediction, if an optimal mode of a current block is a conventional mode, the MPM list needs to be constructed. In a process of constructing the MPM list, a conventional mode ABOVE corresponding to an optimal mode of an above neighbouring luma block and a conventional mode LEFT corresponding to an optimal mode of a left neighbouring luma block need to be acquired first.

Further, for construction of the MIPMPM list, in VVC intra prediction, if an optimal mode of a current block is a MIP mode, the MIPMPM list needs to be constructed. In a process of constructing the MIPMPM list, a MIP mode ABOVE_MIP corresponding to an optimal mode of an above neighbouring luma block and a MIP mode LEFT_MIP corresponding to an optimal mode of a left neighbouring luma block need to be acquired first.

Further, after LEFT_MIP and ABOVE_MIP are acquired, a MIPMPM list containing three most probable MIPMPM modes is constructed according to a following approach, in which numbers in MIPMPM are numbers of the MIP modes, wherein the numbers of the MIP modes ranges from 0 to (M−1), with a first type of luma blocks being numbered 0-15, a second type of luma blocks being numbered 0-7, and a third type of luma blocks being numbered 0-5: if LEFT_MIP is available (not being −1), LEFT_MIP is put into MIPMPMlist; if ABOVE_MIP is available (not being −1), ABOVE_MIP is put into MIPMPMlist after redundancy check; and if LEFT_MIP is unavailable (being −1) and ABOVE_MIP is unavailable (being −1), according to a type of the current block, a default list is added into MIPMPMlist after passing redundancy check until the MIP_MPMlist is full.

Figure 4:
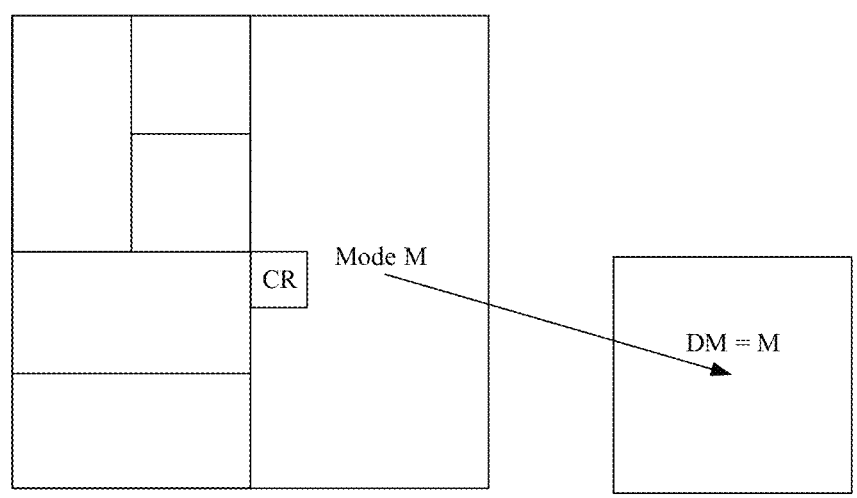
FIG. 4 is a schematic diagram of arrangement for determining a Direct Mode (DM) mode.

Further, it should be added that there is a Direct Mode (DM) using inter-component correlation in a chroma intra prediction process of VVC, which may use an intra prediction mode of a center position of a co-located luma coding block corresponding to a current block to perform intra prediction of a current chroma block. FIG. 4 is a schematic diagram of arrangement for determining a DM mode. As shown in FIG. 4, since a MIP technology is only applied to luma coding blocks, when an intra prediction mode at a position of CR in FIG. 4 is a MIP mode, the MIP mode needs to be mapped to a conventional mode through a "MIP-conventional mapping table" to perform intra prediction of the current chroma block.

Due to a computational burden and a storage cost of a MIP technology, it is difficult to implement a MIP mode on devices with relatively low computational capacity or small storage capacity. Therefore, in a latest VVC working draft design, the MIP mode cannot be effectively transmitted and controlled, which makes it difficult to implement the MIP mode in flexible codec implementation and dynamic video streams.

In order to overcome the above defects, in an embodiment of the present application, when an encoder performs intra prediction on a current block, if it is determined that a MIP mode is used for the current block, while the MIP mode is used for obtaining an intra prediction value of the current block, a MIP mode parameter may be set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. That is, in the present application, one or more syntax elements are transmitted through a VVC bitstream to enable or disable a MIP mode. A syntax element may be located in a data unit in a video sequence layer, a picture layer, and/or a sub-picture layer, a slice/tile/brick layer, wherein a sub-picture refers to a region covering a part of a picture. It can be seen that according to a picture prediction method provided in the present application, a syntax unit may be used for indicating whether a MIP mode is used for a current block in a bitstream, thus simplifying a picture prediction process of the MIP mode, reducing complexity, reducing a storage space and overall time required in an encoding and decoding process, and effectively improving an encoding and decoding efficiency on a basis of ensuring encoding and decoding performance.

Figure 5:
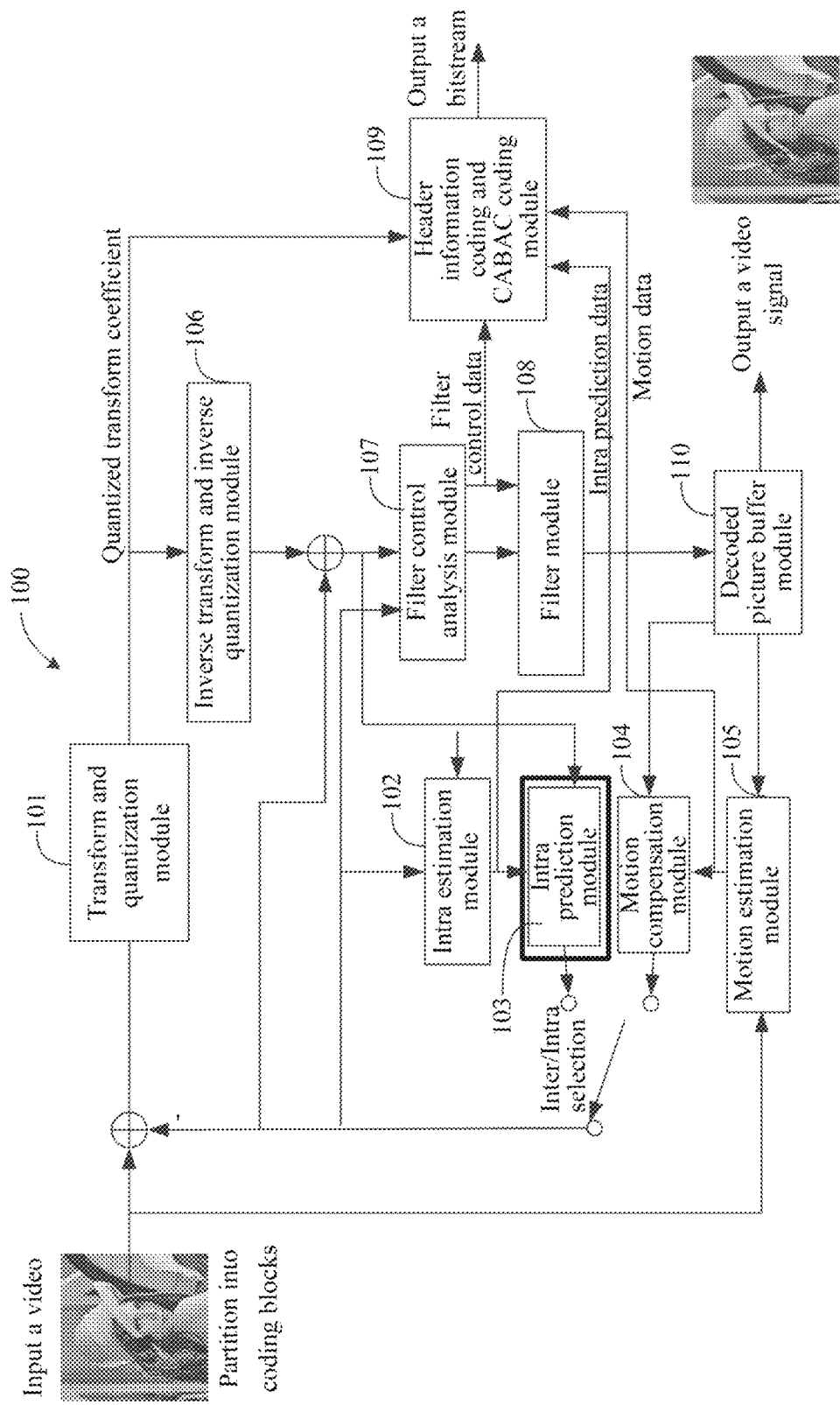
FIG. 5 is a schematic diagram of a structure of a video encoding system.
Figure 6:
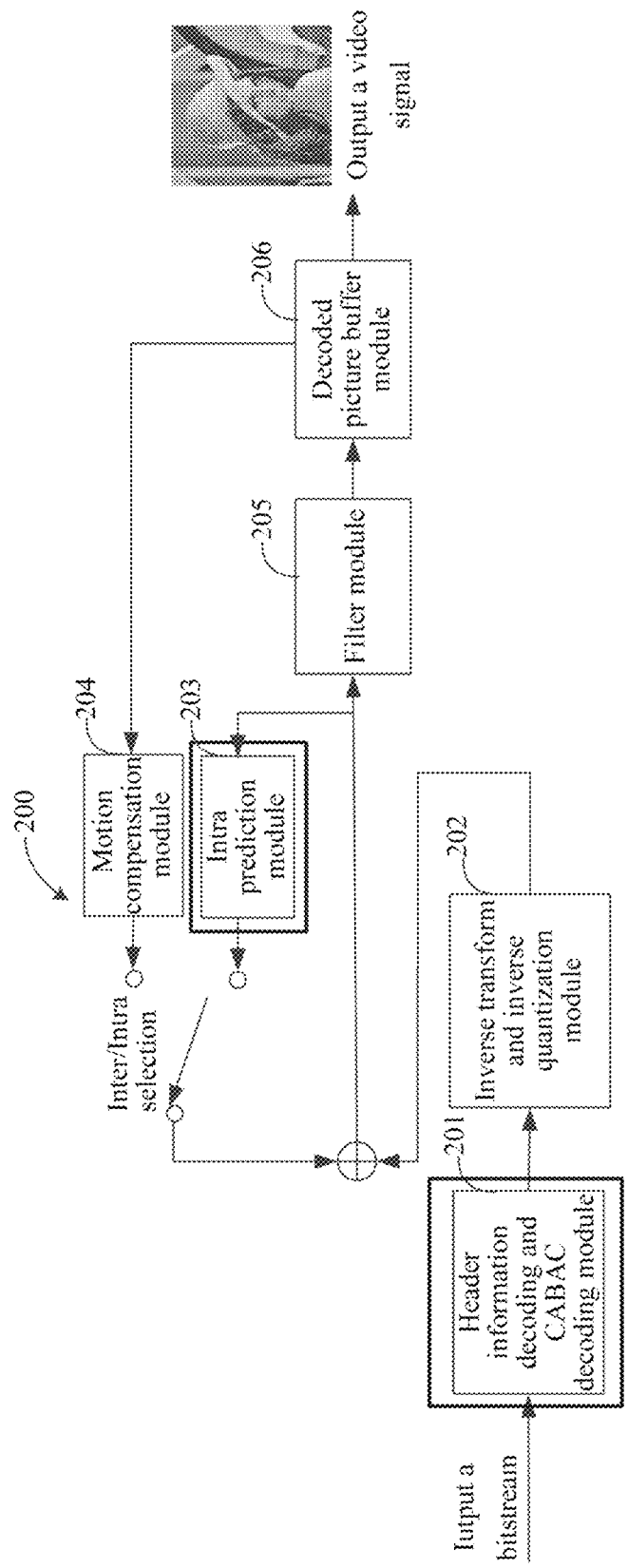
FIG. 6 is a schematic diagram of a structure of a video decoding system.

FIG. 5 is a schematic diagram of a structure of a video encoding system. As shown in FIG. 5, the video encoding system 100 includes parts such as a transform and quantization module 101, an intra estimation module 102, an intra prediction module 103, a motion compensation module 104, a motion estimation module 105, an inverse transform and inverse quantization module 106, a filter control analysis module 107, a deblocking filtering and Sample Adaptive Offset (SAO) filtering module 108, a header information coding and Context-based Adaptive Binary Arithmetic Coding (CABAC) coding module 109, and a decoded picture buffer module 110. FIG. 6 is a schematic diagram of a structure of a video decoding system. As shown in FIG. 6, the video decoding system 200 includes parts such as a header information decoding and CABAC decoding module 201, an inverse transform and inverse quantization module 202, an intra prediction module 203, a motion compensation module 204, a deblocking filtering and SAO filtering module 205, and a decoded picture buffer module 206. After a video picture is processed by parts in the video encoding system 100, such as the transform and quantization module 101, the intra estimation module 102, the intra prediction module 103, the motion compensation module 104, the motion estimation module 105, the deblocking filtering and SAO filtering module 108, and the header information coding and CABAC module 109, a bitstream of the video picture is output. The bitstream is input into the video decoding system 200 and processed by parts in the video decoding system 200, such as the header information decoding and CABAC decoding module 201, the inverse transform and inverse quantization module 202, the intra prediction module 203, and the motion compensation module 204, and finally an original video picture is restored.

The picture prediction method provided in the present application may affect an entropy coding process and an entropy decoding process in an encoding and decoding process. For example, the picture prediction method provided in the present application may be applied at a position of 109 in the structure of the video encoding system shown in FIG. 5, and may also be applied at a position of 201 in the structure of the video decoding system shown in FIG. 6.

Technical solutions in the embodiments of the present application will be clearly and completely described below in conjunction with the drawings in the embodiments of the present application.

Figure 7:
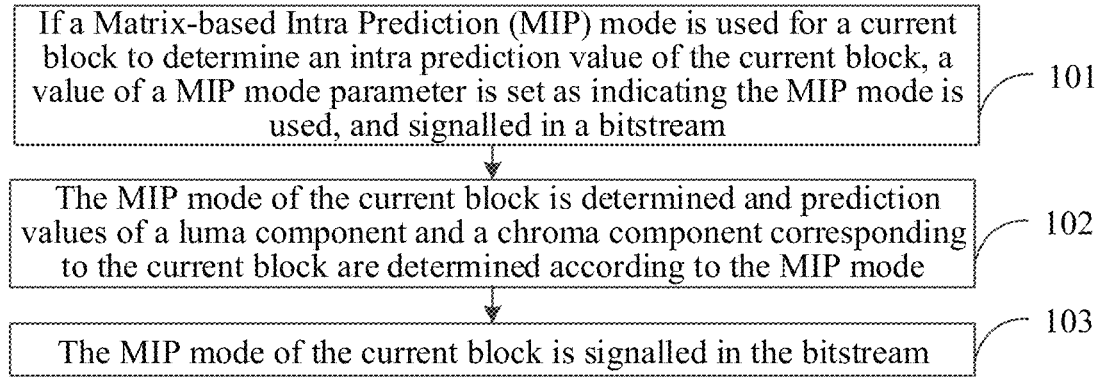
FIG. 7 is a first flow chart of an implementation of a picture prediction method.

An embodiment of the present application provides a picture prediction method, which is applied in an encoder. FIG. 7 is a first flow chart of an implementation of a picture prediction method. As shown in FIG. 7, in the present application, the picture prediction method performed by the encoder may include following acts.

In act 101, if a Matrix-based Intra Prediction (MIP) mode is used for a current block to determine an intra prediction value of the current block, then a value of a MIP mode parameter is set to be for indicating that the MIP mode is used, and is signalled in a bitstream.

In an embodiment of the present application, if a MIP mode is used for a current block to determine an intra prediction value of the current block, then an encoder sets a value of a MIP mode parameter to be for indicating that the MIP mode is used and the value of the MIP mode parameter is signalled in a bitstream. The current block may represent a current block to be encoded or a current block to be decoded. Specifically, in the present application, when the encoder is encoding, the current block is a block to be encoded.

Further, in the embodiment of the present application, when the encoder encodes the current block, it may first select an optimal coding mode in a conventional mode and the MIP mode.

It should be noted that, in an embodiment of the present application, in an intra prediction process of VVC, for any luma coding block, an optimal mode may be selected for coding processing in a conventional mode and a MIP mode. The conventional mode includes 67 intra prediction modes including a Planar mode numbered 0, a DC mode numbered 1, and 65 angular modes.

Further, in the embodiment of the present application, when selecting the optimal mode, an encoder may compare RDcost of a current block between 67 conventional modes and M MIP modes for, so that the optimal mode may be selected and encoded according to a comparison result. Based on a size type of the current block, a value of M is also different. Specifically, when the current block is a first type of luma block, that is, when a size of the current block is 4×4, then M=16; when the current block is a second type of luma block, that is, when a size of the current block is 8×4, 4×8, or 8×8, then M=8; when the current block is a third type of luma block, that is, when the current block is of other sizes, then M=6.

It may be understood that in an embodiment of the present application, if an encoder determines to use a MIP mode to determine an intra prediction value of a current block, then the encoder sets a value of a MIP mode parameter to be for indicating that the MIP mode is used and the value of the MIP mode parameter is signalled in a bitstream. That is to say, an encoder may indicate whether a MIP mode is used for a current block by using a syntax unit, that is, a MIP mode parameter is used for indicating whether a MIP mode is used for a current block.

Exemplarily, in an embodiment of the present application, after an encoder determines to use a MIP mode to determine an intra prediction value of a current block, a value of a MIP mode parameter may be set to 1 and signalled in a bitstream, so that it may indicate that the MIP mode is used for the current block.

Further, in the embodiment of the present application, if the encoder determines that a MIP mode is not used for determining an intra prediction value of the current block, the encoder may set a value of a MIP mode parameter to indicate that the MIP mode is not used and the value of the MIP mode parameter is signalled in the bitstream.

Exemplarily, in an embodiment of the present application, after an encoder determines not to use a MIP mode to determine an intra prediction value of a current block, a value of a MIP mode parameter may be set to 0 and signalled in a bitstream, so that it may indicate that the MIP mode is not used for the current block.

Further, in the embodiment of the present application, after the encoder completes setting the value of the MIP mode parameter, it may indicate the MIP mode parameter with one or more syntax units in the bitstream. That is to say, after the encoder completes setting the MIP mode parameter according to whether the MIP mode is used for the current block, it may indicate the MIP mode parameter with one or more syntax units in the bitstream.

It may be understood that in an embodiment of the present application, a syntax unit indicating a MIP mode parameter may be included in one or more data units of the following data units in a bitstream: a data unit including a current block, a slice header information data unit, a picture header information data unit, a Picture Parameter Set, a Sequence Parameter Set, and an Adaptive Parameter Set.

It should be noted that, in the embodiment of the present application, since one or more data units in the data unit including the current block, the slice header information data unit, the picture header information data unit, the Picture Parameter Set, the Sequence Parameter Set, and the Adaptive Parameter Set in the bitstream may indicate the MIP mode parameter, a MIP mode parameter set by an encoder may be adapted to them.

Exemplarily, in the present application, if a MIP mode parameter is signalled in a Sequence Parameter Set (SPS) by an encoder, the MIP mode parameter may be indicated through sps_mip_enable_flag, so a decoder may determine the MIP mode parameter sps_mip_enable_flag after parsing a data unit of the Sequence Parameter Set in a bitstream.

Exemplarily, in the present application, if a MIP mode parameter is signalled in a Picture Parameter Set (PPS) by an encoder, the MIP mode parameter may be indicated through pps_mip_enable_flag, so a decoder may determine the MIP mode parameter pps_mip_enable_flag after parsing a data unit of the Picture Parameter Set in a bitstream.

Exemplarily, in the present application, if a MIP mode parameter is signalled in an Adaptive Parameter Set (APS) by an encoder, the MIP mode parameter may be indicated through aps_mip_enable_flag, so a decoder may determine the MIP mode parameter aps_mip_enable_flag after parsing a data unit of the Adaptive Parameter Set in a bitstream.

Exemplarily, in the present application, if a MIP mode parameter is signalled in a slice header information data unit by an encoder, the MIP mode parameter may be indicated through slice_mip_enable_flag, so a decoder may determine the MIP mode parameter slice_mip_enable_flag after parsing a data unit of the slice header information data unit in a bitstream.

In act 102, the MIP mode of the current block is determined and prediction values of a luma component and a chroma component corresponding to the current block are determined according to the MIP mode.

In an embodiment of the present application, if a MIP mode is used for a current block to determine an intra prediction value of the current block, an encoder may further determine the MIP mode of the current block, and then determine prediction values of a luma component and a chroma component corresponding to the current block according to the MIP mode.

It may be understood that in an embodiment of the present application, when determining a MIP mode corresponding to a current block, an encoder may first determine a size type of the current block, then construct a candidate MIP mode list based on the size type, and finally determine the MIP mode of the current block from the candidate MIP mode list.

Further, in the embodiment of the present application, the current block may be partitioned into three size types according to a size of the current block. If the size of the current block is W×H, wherein W is a width parameter and H is a height parameter, then the current block with a size of 4×4 may be determined as a first type of luma block, that is, a size type of the current block is determined as the first type. Current block with sizes of 8×4, 4×8, and 8×8 may also be determined as a second type of luma blocks, that is, a size type of the current blocks is determined as the second type. Current blocks of other sizes may also be determined as a third type of luma blocks, that is, a size type of the current blocks is determined as the third type.

It may be understood that in the present application, According to the height parameter and the width parameter, the current block may have 25 sizes. Specifically, it is specified in the standard that a maximum size of a luma block is 128×128. However, a maximum size of a transform unit is 64×64, that is to say, a luma block with a size of 128×128 must be performed quadtree partitioning first, so a size of a maximum luma block is 64×64. Table 1 is a schematic table of sizes of luma blocks, which are as shown in Table 1.

TABLE 1

| (4 × 4)   | (4 × 8)   | (4 × 16)   | (4 × 32)   | (4 × 64)   |
| (8 × 4)   | (8 × 8)   | (8 × 16)   | (8 × 32)   | (8 × 64)   |
| (16 × 4)  | (16 × 8)  | (16 × 16)  | (16 × 32)  | (16 × 64)  |
| (32 × 4)  | (32 × 8)  | (32 × 16)  | (32 × 32)  | (32 × 64)  |
| (64 × 4)  | (64 × 8)  | (64 × 16)  | (64 × 32)  | (64 × 64)  |

At present, a MIP mode is limited according to a height parameter and a width parameter of a current block. Specifically, if a width-height ratio of the current block is greater than 4 or a height-width ratio of the current block is greater than 4, the MIP mode is not used for encoding the current block. Table 2 shows a limitation on sizes of luma blocks in the MIP mode, which are as shown in Table 2.

TABLE 2

| (4 × 4)   | (4 × 8)   | (4 × 16)   | ~~(4 × 32)~~ | ~~(4 × 64)~~ |
| (8 × 4)   | (8 × 8)   | (8 × 16)   | (8 × 32)   | ~~(8 × 64)~~ |
| (16 × 4)  | (16 × 8)  | (16 × 16)  | (16 × 32)  | (16 × 64)  |
| ~~(32 × 4)~~ | (32 × 8)  | (32 × 16)  | (32 × 32)  | (32 × 64)  |
| ~~(64 × 4)~~ | ~~(64 × 8)~~ | (64 × 16)  | (64 × 32)  | (64 × 64)  |

That is to say, in the present application, when determining a size type of a current block, an encoder may set the size type of the current block as a first type if both a width and a height of the current block are equal to 4, that is, the size of the current block is 4×4. The encoder may set the size type of the current block as a second type if both the width and height of the current block are equal to 8, that is, the size of the current block is 8×8, or the width of the current block is equal to 8 and the height is equal to 4, that is, the size of the current block is 8×4, or the width of the current block is equal to 4 and the height is equal to 8, that is, the size of the current block is 4×8. That is, the encoder may set the size type of the current block as a third type if the width and the height of the current block do not meet the aforementioned conditions, that is, the size of the current block is not 4×4, 8×8, 8×4, or 4×8.

Further, in the embodiment of the present application, according to a partitioning manner of size types proposed in a current standard, when determining the size type of the current block, the encoder may set the size type of the current block as the first type if both the width and the height of the current block are equal to 4. If both the width and the height of the current block are equal to 8, or one of a width and a height of the current block is equal to 4, the size type of the current block may be set to the second type. If the width and the height of the current block do not meet the aforementioned conditions, that is, the width and the height of the current block are not equal to 4 or 8 simultaneously, or none of the width and the height of the current block are equal to 4, then the size type of the current block may be set as the third type.

It should be noted that in an embodiment of the present application, an encoder may construct different candidate MIP mode lists for different size types. Specifically, in a MIP technology, M MIP modes are added based on 67 conventional intra prediction modes, wherein a value of M is different for different size types, and a value of M may include 16, 8, and 6.

Exemplarily, in the present application, when a size type of a current block is a first type, a value of M is 16, that is, a candidate MIP mode list may be constructed according to 16 MIP modes; when the size type of the current block is a second type, the value of M is 8, that is, the candidate MIP mode list may be constructed according to eight MIP modes; and when the size type of the current block is a third type, the value of M is 6, that is, the candidate MIP mode list may be constructed according to six MIP modes.

Further, in an embodiment of the present application, after an encoder completes construction of a candidate MIP mode list according to a size type of a current block, a MIP mode used for the current block may be determined from the candidate MIP mode list, so that the MIP mode may be used for performing a picture prediction processing on the current block to obtain an intra prediction value of the current block.

It may be understood that in an embodiment of the present application, after constructing a candidate MIP mode list corresponding to a current block, an encoder may select a MIP mode from the candidate MIP mode list, and then use the MIP mode to determine prediction values of a luma component and a chroma component corresponding to the current block.

Specifically, in an embodiment of the present application, an encoder may first read a mode number k of a MIP mode from a candidate MIP mode list to obtain a corresponding matrix $A_k$ and an offset $b_k$, and perform matrix vector multiplication according to the above formula (1), so as to obtain a prediction value of a luma component corresponding to a current block.

It should be noted that in an embodiment of the present application, after determining a MIP mode of a current block from a candidate MIP mode list, an encoder may further set a MIP mode index number of the current block according to the MIP mode of the current block, and the MIP mode index number is signalled in a bitstream by the encoder.

It may be understood that in the present application, the MIP mode index number of the current block may be used for indicating a specific MIP mode used for the current block. That is to say, on an encoder, the MIP mode index number of the current block is set and signalled in the bitstream by the encoder, and then is transmitted to a decoder. A decoder obtains the MIP mode index number of the current block by parsing the bitstream, and may determine the MIP mode indicated by the MIP mode index number from the candidate MIP mode list of the current block.

In act 103, the MIP mode of the current block is signalled in the bitstream.

In an embodiment of the present application, a MIP mode of a current block may be signalled in a bitstream by an encoder after the encoder determines the MIP mode of the current block and determines prediction values for a luma component and a chroma component corresponding to the current block according to the MIP mode.

That is to say, in the present application, in an implementation process of encoding a current block, not only whether a MIP mode is used for the current block needs to be signalled in a compressed bitstream by an encoder, but also which mode is used needs to be signalled in the bitstream by the encoder, for example, which specific MIP mode is used when using a MIP mode for intra prediction.

An embodiment of the present application provides a picture prediction method. If a MIP mode is used for a current block to determine an intra prediction value of the current block, then a value of a MIP mode parameter is set to be for indicating that the MIP mode is used and signalled in a bitstream by an encoder; the encoder determines the MIP mode of the current block and determines prediction values of a luma component and a chroma component corresponding to the current block according to the MIP mode; and the MIP mode of the current block is signalled in the bitstream by the encoder. That is to say, in an embodiment of the present application, when an encoder performs intra prediction on a current block, if it is determined that a MIP mode is used for the current block, then when the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for the current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Based on the above embodiments, another embodiment of the present application provides a picture prediction method. When an encoder determines to use a MIP mode to predict an intra prediction value of a current block, a MIP mode parameter used for indicating whether the MIP mode is used for the current block is signalled in one or more syntax elements in a bitstream. That is to say, in the present application, one or more syntax elements are transmitted through a VVC bitstream to enable or disable a MIP mode. A syntax element may be located in a data unit in a video sequence layer, a picture layer, and/or a sub-picture layer, a slice/tile/brick layer, wherein a sub-picture refers to a region covering a part of a picture.

Exemplarily, in the present application, an encoder may determine whether to use a MIP mode when encoding a video sequence. An entropy coding unit may encode flags in parameter sets related to all slices in the video sequence. Table 3 shows an embodiment of implementation of a syntax structure in a Sequence Parameter Set (SPS), wherein u(1)

represents an entropy coding approach that has been explained in detail in the VVC working draft.

TABLE 3

| ... ... | Descriptor |
|---|---|
| sps_mip_enable_flag | u(1) |
| ... ... | |

Based on the above Table 3, when an encoder determines that a MIP mode is not applied when encoding an input video sequence, sps_mip_enable_flag may be set equal to 0 and this value is signalled in an SPS related (indirectly) to slices in the video sequence by an entropy coding unit. When the encoder determines that a MIP mode is applied when encoding one or more slices in the input video sequence, sps_mip_enable_flag may be set equal to 1 and this value is signalled in an SPS related (indirectly) to slices in the video sequence by the entropy coding unit.

That is to say, in the present application, after completing setting of a value of a MIP mode parameter sps_mip_enable_flag by an encoder, one or more syntax units may be used in a bitstream for indicating the MIP mode parameter. That is, after the encoder completes setting the MIP mode parameter sps_mip_enable_flag according to whether a MIP mode is used for the current block, the MIP mode parameter sps_mip_enable_flag may be signalled in a Sequence Parameter Set in the bitstream by the encoder.

Exemplarily, in the present application, an encoder may determine whether to use a MIP mode when encoding a picture in a video sequence or a sub-picture in a picture. An entropy coding unit may encode flags in parameter sets related to all slices in the picture or sub-picture. Table 4 shows an embodiment of implementation of a syntax structure in a Picture Parameter Set (PPS), wherein u(1) represents an entropy coding approach that has been explained in detail in the VVC working draft.

TABLE 4

| ... ... | Descriptor |
|---|---|
| pps_mip_enable_flag | u(1) |
| ... ... | |

Based on the above Table 4, when an encoder determines that a MIP mode is not applied when encoding a picture or sub-picture, pps_mip_enable_flag may be set equal to 0 and this value is signalled in a PPS related to slices in a picture or sub-picture by an entropy coding unit. When the encoder determines that a MIP mode is applied when encoding one or more slices in a picture or sub-picture, pps_mip_enable_flag may be set equal to 1 and this value is signalled in a PPS related (indirectly) to slices in the picture or sub-picture by the entropy coding unit.

That is to say, in the present application, after completing setting a value of a MIP mode parameter pps_mip_enable_flag by an encoder, one or more syntax units may be used in a bitstream for indicating the MIP mode parameter. That is, after an encoder completes setting a MIP mode parameter pps_mip_enable_flag according to whether a MIP mode is used for a current block, the MIP mode parameter pps_mip_enable_flag may be signalled in a Picture Parameter Set in the bitstream by the encoder.

Exemplarily, in the present application, an encoder may determine whether to use a MIP mode when encoding a picture in a video sequence or a sub-picture in a picture. An entropy coding unit may encode flags in parameter sets related to all slices in the picture or sub-picture. Table 5 shows an embodiment of implementation of a syntax structure in an Adaptive Parameter Set (APS), wherein u(1) represents an entropy coding approach that has been explained in detail in the VVC working draft.

TABLE 5

| ... ... | Descriptor |
|---|---|
| aps_mip_enable_flag | u(1) |
| ... ... | |

Based on the above Table 5, when the encoder determines that a MIP mode is not applied when encoding a picture or sub-picture, aps_mip_enable_flag may be set equal to 0 and this value is signalled in an APS related to slices in the picture or sub-picture by an entropy coding unit. When the encoder determines that a MIP mode is applied when encoding one or more slices in a picture or sub-picture, aps_mip_enable_flag may be set equal to 1 and this value is signalled in an APS related (indirectly) to slices in the picture or sub-picture by the entropy coding unit.

That is to say, in the present application, after completing setting a value of a MIP mode parameter aps_mip_enable_flag by an encoder, one or more syntax units may be used in a bitstream for indicating the MIP mode parameter. That is, after an encoder completes setting a MIP mode parameter aps_mip_enable_flag according to whether a MIP mode is used for a current block, the MIP mode parameter aps_mip_enable_flag may be signalled in an Adaptive Parameter Set in a bitstream by the encoder.

TABLE 6

| ... ... | Descriptor |
|---|---|
| slice_mip_enable_flag | u(1) |
| ... ... | |

Exemplarily, in the present application, an encoder may determine whether to use a MIP mode when encoding a slice. An entropy coding unit may encode a flag in a slice header. Table 6 shows an embodiment of implementation of a syntax structure in a slice header, wherein u(1) represents an entropy coding approach that has been explained in detail in the VVC working draft.

Based on the above Table 6, when an encoder determines that a MIP mode is not applied when encoding a slice, slice_mip_enable_flag may be set equal to 0 and this value is signalled in a slice header by an entropy coding unit. When the encoder determines that a MIP mode is applied when encoding a slice, slice_mip_enable_flag may be set equal to 1 and the value is signalled in a slice header by the entropy coding unit.

That is to say, in the present application, after completing setting a value of a MIP mode parameter slice_mip_enable_flag by an encoder, one or more syntax units may be used in a bitstream for indicating the MIP mode parameter. That is, after an encoder completes setting a MIP mode parameter slice_mip_enable_flag according to whether a MIP mode is used for a current block, the MIP mode parameter slice_mip_enable_flag may be signalled in a slice header information data unit in a bitstream by the encoder.

Exemplarily, in the present application, when encoding tiles or bricks, an encoder determines whether to use a MIP mode, a similar MIP mode parameter may be signalled in a parameter set representing segmentation of tiles or bricks of a picture or sub-picture, as a part of the parameter set, by an entropy coding unit. Optionally, a similar MIP mode parameter may be signalled in slice data related to tiles or bricks in a slice by the entropy coding unit to indicate whether to use a MIP mode when encoding tiles or bricks.

Exemplarily, in the present application, an encoder may determine to apply a MIP mode when encoding a part of a picture or sub-picture in a video sequence. An entropy coding unit may encode sps_mip_enable_flag in an SPS into 1, encode pps_mip_enable_flag in a PPS or aps_mip_enable_flag in an APS related to a slice in the picture or sub-picture into 1, and at the same time, encode pps_mip_enable_flag in a PPS or aps_mip_enable_flag in an APS related to another picture or sub-picture in the video sequence into 0. Optionally, an entropy coding unit may encode slice_mip_enable_flag (or a similar MIP mode parameter of a tile or brick in slice data) in a slice in a picture or sub-picture into 1, and encode slice_mip_enable_flag (or a similar MIP mode parameter of a tile or brick in slice data) in a slice in another picture or sub-picture into 0.

Exemplarily, in the present application, an encoder may also implicitly convey whether a MIP mode is used for encoding a video sequence in other syntax elements (e.g., a syntax element indicating a profile/tier/level (PTL) in one or more parameter sets of a bitstream or sub-bitstream). For example, a MIP mode of an encoder is set to be disabled in one or more PTLs, and the MIP mode is set to be enabled in other PTLs.

It may be understood that, in the present application, when an encoder transmits an indication to a bitstream that a MIP mode is used for encoding a current block, a decoder may decode the bitstream using MIP mode accordingly.

An embodiment of the present application provides a picture prediction method. If a MIP mode is used for a current block to determine an intra prediction value of the current block, then a value of a MIP mode parameter is set to be for indicating that the MIP mode is used by an encoder and is signalled in a bitstream; the encoder determines the MIP mode of the current block and determines prediction values of a luma component and a chroma component corresponding to the current block according to the MIP mode; and the MIP mode of the current block is signalled in the bitstream. That is to say, in the embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for a current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Figure 8:
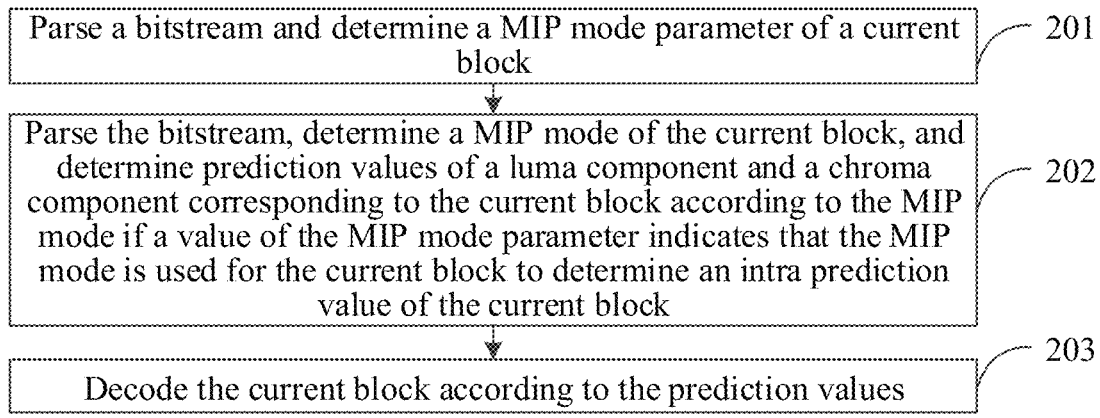
FIG. 8 is a second flow chart of an implementation of a picture prediction method.

Based on the above embodiments, an embodiment of the present application provides a picture prediction method, which is applied in a decoder. FIG. 8 is a second flow chart of an implementation of a picture prediction method. As shown in FIG. 8, in the present application, the picture prediction method performed by the decoder may include following acts.

In act 201, a bitstream is parsed and a Matrix-based Intra Prediction (MIP) mode parameter of a current block is determined.

In an embodiment of the present application, a decoder parses a bitstream and determines a MIP mode parameter of a current block. The current block may represent a current block to be encoded or a current block to be decoded. Specifically, in the present application, when the decoder is decoding, the current block is a block to be decoded.

It may be understood that in an embodiment of the present application, a decoder may parse one or more syntax units in a bitstream to determine a MIP mode parameter of a current block. That is, in the present application, one or more syntax units may be used in a bitstream for indicating a MIP mode parameter.

Further, in the embodiment of the present application, a syntax unit indicating a MIP mode parameter may be included in one or more data units of the following data units in a bitstream: a data unit including the current block, a slice header information data unit, a picture header information data unit, a Picture Parameter Set, a Sequence Parameter Set, and an Adaptive Parameter Set.

It should be noted that in an embodiment of the present application, a MIP mode parameter is used for indicating whether a MIP mode is used for a current block. Specifically, if a MIP mode parameter indicates that a MIP mode is used, a decoder may use the MIP mode to determine an intra prediction value of the current block, and if the MIP mode parameter indicates that a MIP mode is not used, the decoder will not use the MIP mode to determine an intra prediction value of the current block.

Further, in the embodiment of the present application, after parsing a bitstream to determine the MIP mode parameter, the decoder may determine whether the MIP mode is used for the current block according to a value of the MIP mode parameter.

Exemplarily, in an embodiment of the present application, after determining a MIP mode parameter by a decoder, if a value of the MIP mode parameter is 1, it may indicate that a MIP mode is used for a current block, and the decoder may use the MIP mode to determine an intra prediction value of the current block.

Exemplarily, in an embodiment of the present application, after determining a MIP mode parameter by a decoder, if a value of the MIP mode parameter is 0, it may indicate that a MIP mode is not used for a current block, and the decoder will not use the MIP mode to determine an intra prediction value of the current block.

It should be noted that, in an embodiment of the present application, since one or more data units in a data unit including a current block, a slice header information data unit, a picture header information data unit, a Picture Parameter Set, a Sequence Parameter Set, and an Adaptive Parameter Set in a bitstream may indicate a MIP mode parameter, the MIP mode parameter obtained through parsing by a decoder may be adapted to them.

Exemplarily, in the present application, if a MIP mode parameter is signalled in a Sequence Parameter Set by an encoder, the MIP mode parameter may be indicated through sps_mip_enable_flag, so a decoder may determine the MIP mode parameter sps_mip_enable_flag after parsing a data unit of the Sequence Parameter Set in a bitstream.

Exemplarily, in the present application, if a MIP mode parameter is signalled in a Picture Parameter Set by an encoder, the MIP mode parameter may be indicated through pps_mip_enable_flag, so a decoder may determine the MIP mode parameter pps_mip_enable_flag after parsing a data unit of the Picture Parameter Set in a bitstream.

Exemplarily, in the present application, if a MIP mode parameter is signalled in an Adaptive Parameter Set by an encoder, the MIP mode parameter may be indicated through aps_mip_enable_flag, so a decoder may determine the MIP mode parameter aps_mip_enable_flag after parsing a data unit of the Adaptive Parameter Set in a bitstream.

Exemplarily, in the present application, if a MIP mode parameter is signalled in a slice header information data unit by an encoder, the MIP mode parameter may be indicated through slice_mip_enable_flag, so a decoder may determine the MIP mode parameter slice_mip_enable_flag after parsing a data unit of the slice header information data unit in a bitstream.

In act 202, if a value of the MIP mode parameter indicates that a MIP mode is used for the current block to determine an intra prediction value of the current block, the bitstream is parsed, the MIP mode of the current block is determined, and prediction values of a luma component and a chroma component corresponding to the current block are determined according to the MIP mode.

In an embodiment of the present application, after a decoder parses a bitstream and determines a MIP mode parameter of a current block, if a value of the MIP mode parameter indicates that a MIP mode is used for the current block to determine an intra prediction value of the current block, the decoder may continue to parses the bitstream, determines the MIP mode of the current block, and determines prediction values of a luma component and a chroma component corresponding to the current block according to the MIP mode.

It may be understood that in an embodiment of the present application, after a decoder parses a bitstream and determines a MIP mode parameter of a current block, if a value of the MIP mode parameter indicates that a MIP mode is not used for determining an intra prediction value of the current block, the decoder will not use the MIP mode for the current block.

That is to say, in the present application, in an implementation process of decoding a current block, a decoder parses a bitstream. The decoder may not only obtain a MIP mode parameter indicating whether a MIP mode is used for the current block, but also may determine which MIP mode is used for the current block signalled in the bitstream, for example, which MIP mode is used when intra prediction is performed using the MIP mode.

Further, in the embodiment of the present application, in an intra prediction process of VVC, for any luma coding block, an optimal mode may be selected in a conventional mode and a MIP mode for coding processing. The conventional mode includes 67 intra prediction modes including a Planar mode numbered 0, a DC mode numbered 1, and 65 angular modes.

It should be noted that, in an embodiment of the present application, when a decoder uses a MIP mode to determine an intra prediction value of a current block, it may determine a MIP mode of the current block by parsing a bitstream, and then determine prediction values of a luma component and a chroma component corresponding to the current block according to the MIP mode.

It may be understood that in an embodiment of the present application, when a decoder parses a bitstream and determines a MIP mode of a current block, it may first obtain a MIP mode index number of the current block by parsing the bitstream, and then determine a MIP mode indicated by the MIP mode index number as the MIP mode of the current block from a candidate MIP mode list corresponding to a size type after determining the size type of the current block.

Further, in the embodiment of the present application, the MIP mode index number of the current block may be used for indicating a specific MIP mode used for the current block. That is to say, on an encoder after a MIP mode index number of a current block is set by an encoder and signalled in a bitstream, and then it is transmitted to a decoder. The decoder obtains the MIP mode index number of the current block by parsing the bitstream, and may determine the MIP mode indicated by the MIP mode index number from the candidate MIP mode list of the current block.

It should be noted that in an embodiment of the present application, when determining a MIP mode of a current block, a decoder may first determine a size type of the current block. Specifically, based on the Table 2 above, when a decoder determines a size type of a current block, the size type of the current block may be set as a first type if both a width and a height of the current block are equal to 4, that is, a size of the current block is 4×4. The size type of the current block may be set as a second type if both the width and height of the current block are equal to 8, that is, the size of the current block is 8×8, or the width of the current block is equal to 8 and the height is equal to 4, that is, the size of the current block is 8×4, or the width of the current block is equal to 4 and the height is equal to 8, that is, the size of the current block is 4×8. The size type of the current block may be set as a third type if the width and height of the current block do not meet the aforementioned conditions, that is, the size of the current block is not 4×4, 8×8, 8×4, or 4×8.

Further, in an embodiment of the present application, according to a partitioning manner of size types proposed in the current standard, when an encoder determines a size type of a current block, the size type of the current block may be set as a first type if both a width and a height of the current block are equal to 4. If both the width and height of the current block are equal to 8, or one of a width and a height of the current block is equal to 4, the size type of the current block may be set as a second type. If the width and height of the current block do not meet the aforementioned conditions, that is, the width and the height of the current block are not equal to 4 or 8 simultaneously, or none of the width and the height of the current block are equal to 4, then the size type of the current block may be set as a third type.

It may be understood that in an embodiment of the present application, a decoder may construct different candidate MIP mode lists for different size types. Specifically, in a MIP technology, M MIP modes are added based on 67 conventional intra prediction modes, wherein a value of M is different for different size types, and a value of M may include 16, 8, and 6.

Exemplarily, in the present application, when a size type of a current block is a first type, a value of M is 16, that is, a candidate MIP mode list may be constructed according to 16 MIP modes; when the size type of the current block is a second type, the value of M is 8, that is, the candidate MIP mode list may be constructed according to eight MIP modes; and when the size type of the current block is a third type, the value of M is 6, that is, the candidate MIP mode list may be constructed according to six MIP modes.

Exemplarily, in an embodiment of the present application, a decoder may first read a mode number k of a MIP mode from a candidate MIP mode list to obtain a corresponding matrix $A_k$ and an offset $b_k$, and perform matrix vector multiplication according to the above formula (1), so as to obtain a prediction value of a luma component corresponding to a current block.

In act 203, the current block is decoded according to the prediction values.

In an embodiment of the present application, a decoder may decode a current block according to prediction values of a luma component and a chroma component after parsing a bitstream to determine a MIP mode of the current block and determining the prediction values of the luma component and chroma component corresponding to the current block according to the MIP mode.

An embodiment of the present application provides a picture prediction method. A decoder parses a bitstream and determines a MIP mode parameter of a current block; if a value of the MIP mode parameter indicates that a MIP mode is used for the current block to determine an intra prediction value of the current block, the bitstream is parsed, the MIP mode of the current block is determined and prediction values of a luma component and a chroma component corresponding to the current block are determined according to the MIP mode; and the current block is decoded according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for the current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Based on the above embodiments, another embodiment of the present application provides a picture prediction method, in which a decoder parses a bitstream and may obtain one or more syntax elements for indicating whether a MIP mode is used for a current block to determine a prediction value of the current block. Further, in the present application, the decoder parses the obtained one or more syntax elements, which may indicate whether to use a MIP mode when decoding a video sequence, one or more pictures, slices, tiles, or bricks. That is to say, in the present application, one or more syntax elements are transmitted through a VVC bitstream to enable or disable a MIP mode. A syntax element may be located in a data unit in a video sequence layer, a picture layer and/or a sub-picture layer, a slice/tile/brick layer, wherein a sub-picture refers to a region covering a part of a picture.

Exemplarily, in the present application, a decoder may obtain a MIP mode parameter from parameter sets related to all slices in a video sequence. Specifically, a decoder may obtain a MIP mode parameter from an SPS. The above Table 3 shows an embodiment of implementation of a syntax structure in an SPS, wherein u(1) represents an entropy decoding approach that has been explained in detail in the VVC working draft.

When a decoder determines that a value of a MIP mode parameter sps_mip_enable_flag is equal to 0, the decoder will not use a MIP mode when decoding a slice related (indirectly) to the SPS. When the decoder determines that the value of the MIP mode parameter sps_mip_enable_flag is equal to 1, the decoder applies a MIP mode when decoding a slice related (indirectly) to the SPS.

That is to say, in the present application, a decoder may determine a MIP mode parameter sps_mip_enable_flag after parsing a Sequence Parameter Set in a bitstream, and then may determine whether a MIP mode is used for a current block for decoding according to a value of the MIP mode parameter sps_mip_enable_flag.

Exemplarily, in the present application, a decoder may obtain a MIP mode parameter from parameter sets related to all slices in a picture or sub-picture in a video sequence. Specifically, a decoder may obtain a MIP mode parameter from a Picture Parameter Set (PPS). The above Table 4 shows an embodiment of implementation of a syntax structure in a PPS, wherein u(1) represents an entropy decoding approach that has been explained in detail in the VVC working draft.

When a decoder determines that a value of a MIP mode parameter pps_mip_enable_flag is equal to 0, the decoder will not use a MIP mode when decoding a slice related to the PPS.

When the decoder determines that the value of the MIP mode parameter pps_mip_enable_flag is equal to 1, the decoder applies a MIP mode when decoding a slice related to the PPS.

That is to say, in the present application, a decoder may determine a MIP mode parameter pps_mip_enable_flag after parsing a Picture Parameter Set in a bitstream, and then may determine whether a MIP mode is used for a current block for decoding according to a value of the MIP mode parameter pps_mip_enable_flag.

Exemplarily, in the present application, a decoder may obtain a MIP mode parameter from parameter sets related to all slices in a picture or sub-picture in a video sequence. Specifically, a decoder may obtain a MIP mode parameter from an APS. The above Table 5 shows an embodiment of implementation of a syntax structure in an APS, wherein u(1) represents an entropy decoding approach that has been explained in detail in the VVC working draft.

When a decoder determines that a value of a MIP mode parameter aps_mip_enable_flag is equal to 0, the decoder will not use a MIP mode when decoding a slice related to the APS. When the decoder determines that the value of the MIP mode parameter aps_mip_enable_flag is equal to 1, the decoder applies a MIP mode when decoding a slice related to the APS.

That is to say, in the present application, a decoder may determine a MIP mode parameter aps_mip_enable_flag after parsing an Adaptive Parameter Set in a bitstream, and then may determine whether a MIP mode is used for a current block for decoding according to a value of the MIP mode parameter aps_mip_enable_flag.

Exemplarily, in the present application, a decoder may obtain a MIP mode parameter from a slice header. The above Table 6 shows an embodiment of implementation of a syntax structure in a slice header, wherein u(1) represents an entropy decoding approach that has been explained in detail in the VVC working draft.

When a decoder determines that a value of a MIP mode parameter slice_mip_enable_flag is equal to 0, the decoder will not use a MIP mode when decoding a slice. When the decoder determines that the value of the MIP mode parameter slice_mip_enable_flag is equal to 1, the decoder applies a MIP mode when decoding the slice.

That is to say, in the present application, a decoder may determine a MIP mode parameter slice_mip_enable_flag after parsing a slice header information data unit in a bitstream, and then may determine whether a MIP mode is used for a current block for decoding according to a value of the MIP mode parameter slice_mip_enable_flag.

Exemplarily, in the present application, when decoding a tile or brick, a decoder may obtain a similar MIP mode parameter. The similar MIP mode parameter, as a part of a parameter set representing segmentation of tiles or bricks of a picture or sub-picture, indicates whether a MIP mode is used when tiles or bricks of a picture or sub-picture are encoded. Optionally, a decoder may obtain a similar MIP mode parameter from slice data related to tiles or bricks in a slice to indicate whether a MIP mode is used when a tile or brick is encoded. Exemplarily, in the present application, a decoder may obtain various MIP mode parameters from different data units in an input bitstream. The decoder may obtain sps_mip_enable_flag in an SPS is equal to 1, pps_mip_enable_flag in a PPS or aps_mip_enable_flag in an APS related to a slice in a picture or sub-picture is equal to 1, and at the same time, pps_mip_enable_flag in a PPS or aps_mip_enable_flag in an APS related to another picture or sub-picture is equal to 0. In this case, the decoder may apply a MIP mode when decoding a part of pictures or sub-pictures in the input bitstream, while not applying the MIP mode when decoding other pictures or sub-pictures. Optionally, the decoder may obtain from a header of a slice in a picture or sub-picture that slice_mip_enable_flag (or a similar MIP mode parameter of a block or brick in slice data) is equal to 1, and the decoder may apply a MIP mode when decoding the slice. The decoder may also obtain from a slice header of another slice in a picture or sub-picture that slice_mip_enable_flag (or a similar MIP mode parameter of a block or brick in slice data) is equal to 0, and the decoder will not apply a MIP mode when decoding the slice.

Exemplarily, in the present application, a decoder may be implicitly informed whether a MIP mode is used for decoding an input bitstream from other syntax elements (e.g., a syntax element indicating a PTL in one or more parameter sets of a bitstream or sub-bitstream). For example, a MIP mode is set to be disabled when decoding in one or more PTLs, while the MIP mode is set to be enabled when decoding in other PTLs.

An embodiment of the present application provides a picture prediction method. A decoder parses a bitstream and determines a MIP mode parameter of a current block; if a value of the MIP mode parameter indicates that a MIP mode is used for the current block to determine an intra prediction value of the current block, the bitstream is parsed, the MIP mode of the current block is determined, and prediction values of a luma component and a chroma component corresponding to the current block are determined according to the MIP mode; and the current block is decoded according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for a current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Based on the above embodiments, in yet another embodiment of the present application, in an embodiment using the encoder and the decoder described in the above embodiments, a MIP mode may be configured feasibly in a session negotiation process, for example.

Exemplarily, in a first exemplary system, a transmitter including an encoder will generate a bitstream for a receiver according to a processing capability of the receiver. For example, during session negotiation, when a transmitter determines that a receiver cannot successfully enable a MIP mode to process a bitstream (or when a receiver informs a transmitter that the receiver cannot successfully enable a MIP mode to decode a bitstream), the transmitter will generate the bitstream by disabling a MIP mode, for example, by setting sps_mip_enable_flag equal to 0.

Exemplarily, a second exemplary system includes a transmitter that stores a plurality of bitstreams to which MIP mode is applied when decoding the whole or different parts of a bitstream. During session negotiation, when the transmitter determines that a receiver cannot successfully enable a MIP mode to process the bitstream (or when a receiver informs the transmitter that the receiver cannot successfully enable a MIP mode to decode the bitstream), the transmitter will choose to send a bitstream with a MIP mode disabled, for example, a bitstream with sps_mip_enable_flag equal to 0.

Exemplarily, a third exemplary system is a real-time communication system, such as a video conference, a video phone, and a live video stream. Unlike the first exemplary system, a receiver is not always unable to process a bitstream encoded using a MIP mode. For example, the receiver may have a battery. When energy in the battery is lower than a threshold (e.g., 20% of a total power), the receiver informs a transmitter that the receiver cannot process a bitstream encoded using a MIP mode due to the low energy. Upon receiving a request from the receiver, the transmitter generates a bitstream by disabling a MIP mode, for example, by starting a new Encoding Video Sequence (CVS) with a new SPS containing sps_mip_enable_flag equal to 0, or by generating a new PPS or APS containing a MIP enable flag (a MIP mode parameter) equal to 0, or by setting a MIP enable flag in a slice header (or another similar syntax element of a tile or brick) equal to 0. When the receiver has its battery charged, the receiver may inform the transmitter that the receiver is capable of processing a bitstream encoded using a MIP mode. In this case, the transmitter may generate a bitstream using a MIP mode and set a corresponding flag in an SPS, a PPS, an APS, or a slice header. Alternatively, the transmitter may switch between different tracks containing different bitstreams generated through configurations of different MIP modes to meet a requirement from the receiver.

An embodiment of the present application provides a picture prediction method, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for a current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Figure 9:
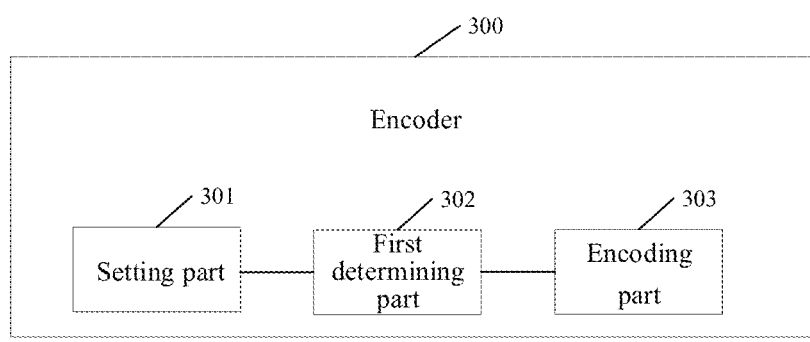
FIG. 9 is a first schematic diagram of a structure of an encoder according to an embodiment of the present application.

Based on the above embodiments, in yet another embodiment of the present application, FIG. 9 is a first schematic diagram of a structure of an encoder according to an embodiment of the present application. As shown in FIG. 9, the encoder 300 according to an embodiment of the present application may include a setting part 301, a first determining part 302, and an encoding part 303.

The setting part 301 is configured to set a value of a MIP mode parameter to be for indicating a MIP mode is used and signal the value of the MIP mode parameter in a bitstream if the MIP mode is used for a current block to determine an intra prediction value of the current block.

The first determining part 302 is configured to determine the MIP mode of the current block and determine prediction values of a luma component and a chroma component corresponding to the current block according to the MIP mode.

The encoding part 303 is configured to signal the MIP mode of the current block in a bitstream.

Further, in the embodiment of the present application, the setting part 301 is further configured to set a value of a MIP mode parameter to be for indicating a MIP mode is not used and signal the value of the MIP mode parameter in a bitstream if the MIP mode is not used for the current block to determine an intra prediction value of the current block.

Further, in the embodiment of the present application, one or more syntax units are used in the bitstream for indicating the MIP mode parameter.

Further, in the embodiment of the present application, the syntax units are included in one or more data units of the following data units in a bitstream: a data unit including the current block, a slice header information data unit, a picture header information data unit, a Picture Parameter Set, a Sequence Parameter Set, and an Adaptive Parameter Set.

Further, in the embodiment of the present application, the first determining part 302 is specifically configured to determine a size type of the current block; construct a candidate MIP mode list based on the size type; and determine the MIP mode of the current block from the candidate MIP mode list.

Further, in the embodiment of the present application, the first determining part 302 is further specifically configured to construct the candidate MIP mode list according to 16 MIP modes when the size type of the current block is a first type; construct the candidate MIP mode list according to 8 MIP modes when the size type of the current block is a second type; and construct the candidate MIP mode list according to 6 MIP modes when the size type of the current block is a third type.

Further, in the embodiment of the present application, the first determining part 302 is further specifically configured to set the size type of the current block as the first type when both a width and a height of the current block are equal to 4; set the size type of the current block as the second type when both a width and a height of the current block are equal to 8, or, a width of the current block is equal to 8 and a height is equal to 4, or a width of the current block is equal to 4 and a height is equal to 8; and set the size type of the current block as the third type when a width and a height of the current block do not meet the aforementioned conditions.

Further, in the embodiment of the present application, the first determining part 302 is further specifically configured to set the size type of the current block as the first type when both a width and a height of the current block are equal to 4; set the size type of the current block as the second type when both a width and a height of the current block are equal to 8 or one of a width and a height of the current block is equal to 4; and set the size type of the current block as the third type when a width and a height of the current block do not meet the aforementioned conditions.

Figure 10:
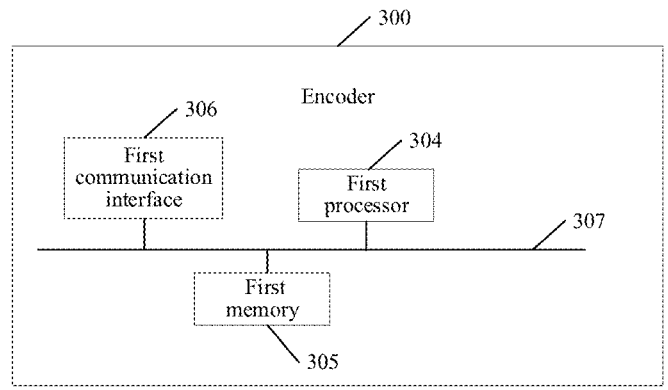
FIG. 10 is a second schematic diagram of a structure of an encoder according to an embodiment of the present application.

FIG. 10 is a second schematic diagram of a structure of an encoder according to an embodiment of the present application. As shown in FIG. 10, the encoder 300 according to an embodiment of the present application may further include a first processor 304, a first memory 305 configured to store instructions executable for the first processor 304, a first communication interface 306, and a first bus 307 configured to connect the first processor 304, the first memory 305, and the first communication interface 306.

Further, in the embodiment of the present application, the first processor 304 is configured to set a value of a MIP mode parameter to be for indicating a MIP mode is used and signal the value of the MIP mode parameter in a bitstream if the MIP mode is used for a current block to determine an intra prediction value of the current block; determine the MIP mode of the current block and determine prediction values of a luma component and a chroma component corresponding to the current block; and signal the MIP mode of the current block in the bitstream according to the MIP mode.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product, the computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

An embodiment of the present application provides a picture encoder. If a MIP mode is used for a current block to determine an intra prediction value of the current block, then a value of a MIP mode parameter is set to be for indicating the MIP mode is used and signalled in a bitstream by the encoder; the encoder determines the MIP mode of the current block and determines prediction values of a luma component and a chroma component corresponding to the current block according to the MIP mode; and the MIP mode of the current block is signalled in the bitstream by the encoder. A decoder parses the bitstream and determines the MIP mode parameter of the current block; if the value of the MIP mode parameter indicates that the MIP mode is used for the current block to determine the intra prediction value of the current block, the decoder parses the bitstream, determines the MIP mode of the current block and determines the prediction values of the luma component and the chroma component of the current block according to the MIP mode; and the decoder decodes the current block according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for the current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

Figure 11:
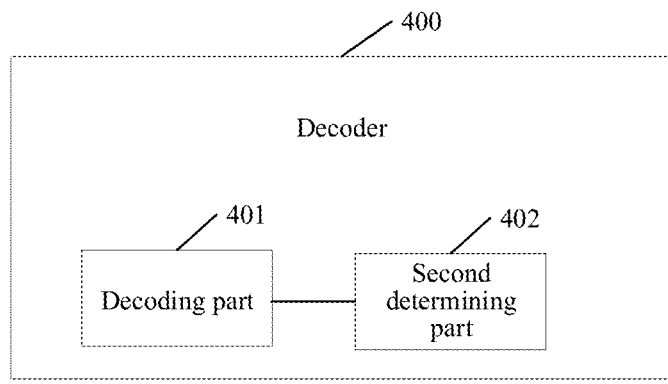
FIG. 11 is a first schematic diagram of a structure of a decoder according to an embodiment of the present application.

Based on the above embodiments, in another embodiment of the present application, FIG. 11 is a first schematic diagram of a structure of a decoder according to an embodiment of the present application. As shown in FIG. 11, the decoder 400 according to an embodiment of the present application may include a decoding part 401 and a second determining part 402.

The decoding part 401 is configured to parse a bitstream, determine a MIP mode parameter of a current block; and parse the bitstream and determine a MIP mode of the current block if a value of the MIP mode parameter indicates that the MIP mode is used for the current block to determine an intra prediction value of the current block.

The second determining part 402 is configured to determine prediction values of a luma component and a chroma component corresponding to the current block according to the MIP mode.

The decoding part 401 is further configured to decode the current block according to the prediction values.

Further, in the embodiment of the present application, the second determining part 402 is further configured to determine that a MIP mode is not used for the current block if a value of the MIP mode parameter indicates that the MIP mode is not used for the current block to determine an intra prediction value of the current block after the bitstream is parsed and the MIP mode parameter of the current block is determined.

Further, in the embodiment of the present application, one or more syntax units is used in the bitstream for indicating the MIP mode parameter.

Further, in the embodiment of the present application, the syntax units are included in one or more data units of the following data units in a bitstream: a data unit including the current block, a slice header information data unit, a picture header information data unit, a Picture Parameter Set, a Sequence Parameter Set, and an Adaptive Parameter Set.

Further, in the embodiment of the present application, the decoding part 401 is specifically configured to parse the bitstream to obtain a MIP mode index number of the current block; determine a size type of the current block; and determine a MIP mode indicated by the MIP mode index number from a candidate MIP mode list corresponding to the size type as the MIP mode of the current block.

Further, in the embodiment of the present application, when the size type of the current block is a first type, the candidate MIP mode list is constructed according to 16 MIP modes;

when the size type of the current block is a second type, the candidate MIP mode list is constructed according to 8 MIP modes; and when the size type of the current block is a third type, the candidate MIP mode list is constructed according to 6 MIP modes.

Further, in the embodiment of the present application, the decoding part 401 is further specifically configured to set the size type of the current block as the first type when both a width and a height of the current block are equal to 4; set the size type of the current block as the second type when both a width and a height of the current block are equal to 8, or a width of the current block is equal to 8 and a height is equal to 4, or a width of the current block is equal to 4 and a height is equal to 8; set the size type of the current block as the third type when a width and a height of the current block do not meet the aforementioned conditions.

Further, in the embodiment of the present application, the decoding part 401 is further specifically configured to set the size type of the current block as the first type when both a width and a height of the current block are equal to 4; set the size type of the current block as the second type when both a width and a height of the current block are equal to 8 or one of a width and a height of the current block is equal to 4; set the size type of the current block as a third type when a width and a height of the current block do not meet the aforementioned conditions.

Figure 12:
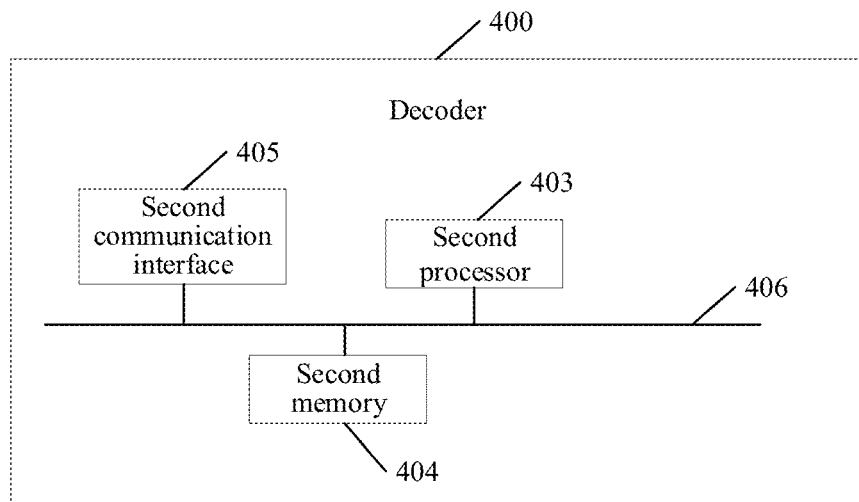
FIG. 12 is a second schematic diagram of a structure of a decoder according to an embodiment of the present application.

FIG. 12 is a second schematic diagram of a structure of a decoder according to an embodiment of the present application. As shown in FIG. 12, the decoder 400 according to an embodiment of the present application may further include a second processor 403, a second memory 404 configured to store instructions executable for the second processor 403, a second communication interface 405, and a second bus 406 configured to connect the second processor 403, the second memory 404, and the second communication interface 405.

Further, in the embodiment of the present application, the second processor 403 is configured to parse a bitstream and determine a MIP mode parameter of a current block; parse the bitstream and determine a MIP mode of the current block and determine prediction values of a luma component and a chroma component corresponding to the current block according to the MIP mode if a value of the MIP mode parameter indicates that the MIP mode is used for the current block to determine an intra prediction value of the current block; and decode the current block according to the prediction values.

In addition, various functional modules in the embodiments may be integrated into one processing unit, or various units may be physically presented separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical solutions of the embodiments, in essence, or part contributing to the prior art, or all or part of the technical solutions, may be embodied in a form of a software product, the computer software product is stored in a storage medium, and includes several instructions for enabling a computer device (which may be a personal computer, a server, or a network device, etc.) or a processor to perform all or part of acts of the methods of the embodiments. The aforementioned storage medium includes various media, such as a U disk, a mobile hard disk, a Read Only Memory (ROM), a Random Access Memory (RAM), a magnetic disk, or an optical disk, which are capable of storing program codes.

An embodiment of the present application provides a picture decoder, which parses a bitstream and determines a MIP mode parameter of a current block; if a value of the MIP mode parameter indicates that a MIP mode is used for the current block to determine an intra prediction value of the current block, the decoder parses the bitstream, determines the MIP mode of the current block and determines prediction values of a luma component and a chroma component corresponding to the current block according to the MIP mode; and decodes the current block according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block.

It may be seen that according to the picture prediction method provided in the present application, a syntax unit may be used for indicating whether a MIP mode is used for the current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

An embodiment of the present application provides a computer-readable storage medium on which a program is stored, when the program is executed by a processor, the method described in the foregoing embodiment is implemented.

Specifically, program instructions corresponding to a picture prediction method in an embodiment may be stored on a storage medium, such as an optical disk, a hard disk, and a U disk. When program instructions corresponding to a picture prediction method in a storage medium are read or executed by an electronic device, following acts are included: if a MIP mode is used for a current block to determine an intra prediction value of the current block, then a value of a MIP mode parameter is set to be for indicating the MIP mode is used, and signalled in a bitstream; the MIP mode of the current block is determined and prediction values of a luma component and a chroma component corresponding to the current block are determined according to the MIP mode; and the MIP mode of the current block is signalled in the bitstream.

Specifically, program instructions corresponding to a picture prediction method in an embodiment may be stored on a storage medium, such as an optical disk, a hard disk, and a U disk. When program instructions corresponding to a picture prediction method in a storage medium are read or executed by an electronic device, following acts are further included: a bitstream is parsed and a MIP mode parameter of a current block is determined; if a value of the MIP mode parameter indicates that a MIP mode is used for the current block to determine an intra prediction value of the current block, the bitstream is parsed, the MIP mode of the current block is determined, and prediction values of a luma component and a chroma component corresponding to the current block are determined according to the MIP mode; and the current block is decoded according to the prediction values.

It should be understood by a person skilled in the art that the embodiments of the present application may be provided as methods, systems, or computer program products. Therefore, the present application may use a form of a hardware embodiment, a software embodiment, or an embodiment combining software and hardware. Moreover, the present application may use a form of a computer program product implemented on one or more computer usable storage media (including, but not limited to, a magnetic disk memory, an optical memory, etc.) containing computer usable program codes.

The present application is described with reference to implementation flowcharts and/or block diagrams of the methods, devices (systems), and computer program products of the embodiments of the present application. It should be understood that each flow and/or block in the flowcharts and/or the block diagrams, and combinations of flows and/or blocks in the flowcharts and/or the block diagrams may be implemented by computer program instructions. These computer program instructions may be provided to a processor of a general purpose computer, a special purpose computer, an embedded processing machine, or another programmable data processing device to generate a machine, such that an apparatus for implementing functions specified in one or more flows in the implementation flowcharts and/or one or more blocks in the block diagrams is generated through instructions that are executed by a processor of a computer or another programmable data processing device.

These computer program instructions may also be stored in a computer-readable memory that may guide a computer or another programmable data processing device to operate in a particular manner, such that instructions stored in the computer-readable memory generate an article of manufacture including an instruction apparatus, wherein the instruction apparatus implements functions specified in one or more flows in the implementation flowcharts and/or one or more blocks in the block diagrams.

These computer program instructions may also be loaded on a computer or another programmable data processing device to enable a series of operational acts to be performed on a computer or another programmable device to generate a computer-implemented processing, such that instructions executed on the computer or the another programmable device provide acts for implementing functions specified in one or more flows in the implementation flowcharts and/or one or more blocks in the block diagrams.

The above are only preferred embodiments of the present application and are not intended to limit the scope of protection of the present application.

INDUSTRIAL APPLICABILITY

Provided in the embodiments of the present application are a picture prediction method, an encoder, a decoder, and a storage medium. If a MIP mode is used for a current block to determine an intra prediction value of the current block, a value of a MIP mode parameter is set to be for indicating the MIP mode is used, and signalled in a bitstream by an encoder; the MIP mode of the current block is determined and prediction values of a luma component and a chroma component corresponding to the current block is determined; and the MIP mode of the current block is signalled in the bitstream. A decoder parses a bitstream and determines a MIP mode parameter of a current block; if a value of the MIP mode parameter indicates that a MIP mode is used for the current block to determine an intra prediction value of the current block, the decoder parses the bitstream, determines the MIP mode of the current block, and determines prediction values of a luma component and a chroma component corresponding to the current block according to the MIP mode; and decodes the current block according to the prediction values. That is to say, in an embodiment of the present application, when an encoder performs intra prediction on a current block, if it is determined that a MIP mode is used for the current block, then while the MIP mode is used for obtaining an intra prediction value of the current block, a MIP mode parameter is set and signalled in a bitstream and transmitted to a decoder. A decoder parses the bitstream to obtain the MIP mode parameter. If the MIP mode parameter indicates that the MIP mode is used for the current block, the decoder may use the MIP mode to determine the intra prediction value of the current block. It may be seen that according to the picture prediction method provided in the present application, a syntax unit may be used for indicating whether a MIP mode is used for a current block in a bitstream, thus simplifying a picture prediction process, reducing complexity, reducing a storage space and overall time required in an encoding and decoding process, and effectively improving an encoding and decoding efficiency on a basis of ensuring encoding and decoding performance.

What is claimed is:

1. A picture prediction method, applied to an encoder, the method comprising:
setting a value of a Matrix-based Intra Prediction (MIP) mode parameter to be for indicating an MIP mode is used and signalling the value of the MIP mode parameter in a bitstream if an MIP mode is used for a current block to determine an intra prediction value of the current block;
determining the MIP mode of the current block, and determining prediction values of a luma component and a chroma component corresponding to the current block according to the MIP mode, wherein the determining the MIP mode of the current block comprises:
determining a size type of the current block,
constructing a candidate MIP mode list based on the size type, the candidate MIP mode list corresponding MIP mode index numbers to candidate MIP modes, and
determining the MIP mode of the current block from the candidate MIP mode list; and
signalling an MIP mode index of the MIP mode of the current block in the bitstream, wherein the MIP mode parameter is indicated by a syntax unit, wherein the syntax unit is included in a data unit comprising the current block, and wherein in an event that the encoder determines that the MIP mode is not used for determining the intra prediction value, the encoder sets the value of the MIP mode parameter to indicate that the MIP mode is not used, wherein signalling the MIP mode index of the MIP mode is independent from the MIP mode index numbers.

2. The method according to claim 1, further comprising:
setting the value of the MIP mode parameter to be for indicating the MIP mode is not used and signalling the value of the MIP mode parameter in the bitstream if the MIP mode is not used for the current block to determine the intra prediction value of the current block.

3. The method according to claim 1, wherein the determining the MIP mode of the current block comprises:
determining the size type of the current block;
constructing the candidate MIP mode list based on the size type; and
determining the MIP mode of the current block from the candidate MIP mode list.

4. The method according to claim 3, wherein the constructing the candidate MIP mode list based on the size type comprises:
constructing the candidate MIP mode list according to 16 MIP modes when the size type of the current block is a first type;
constructing the candidate MIP mode list according to 8 MIP modes when the size type of the current block is a second type;
constructing the candidate MIP mode list according to 6 MIP modes when the size type of the current block is a third type.

5. The method according to claim 4, wherein the determining the size type of the current block comprises:
setting the size type of the current block as the first type when both a width and a height of the current block are equal to 4;
setting the size type of the current block as the second type when both the width and the height of the current block are equal to 8, or the width of the current block is equal to 8 and the height is equal to 4, or the width of the current block is equal to 4 and the height is equal to 8;
setting the size type of the current block as the third type when the width and the height of the current block do not meet the aforementioned conditions.

6. The method according to claim 4, wherein the determining the size type of the current block comprises:
setting the size type of the current block as the first type when both a width and a height of the current block are equal to 4;
setting the size type of the current block as the second type when both the width and the height of the current block are equal to 8 or one of the width and the height of the current block is equal to 4;
setting the size type of the current block as a third type when the width and the height of the current block do not meet the aforementioned conditions.

7. A picture prediction method, applied to a decoder, the method comprising:
parsing a bitstream and determining a Matrix-based Intra Prediction (MIP) mode parameter of a current block;
parsing the bitstream, determining an MIP mode of the current block and determining prediction values of a luma component and a chroma component corresponding to the current block according to the MIP mode if a value of the MIP mode parameter indicates that the MIP mode is used for the current block to determine an intra prediction value of the current block, wherein the determining the MIP mode of the current block comprises:

determining a size type of the current block, constructing a candidate MIP mode list based on the size type, the candidate MIP mode list corresponding MIP mode index numbers to candidate MIP modes, and determining the MIP mode of the current block from the candidate MIP mode list, wherein the MIP mode parameter is indicated by a syntax unit, wherein the syntax unit is included in a data unit comprising the current block, and wherein in an event that the encoder determines that the MIP mode is not used for determining the intra prediction value, the encoder sets the value of the MIP mode parameter to indicate that the MIP mode is not used, wherein signalling the MIP mode index of the MIP mode is independent from the MIP mode index numbers.

8. The method according to claim 7, wherein after parsing the bitstream and determining the MIP mode parameter of the current block, the method further comprises:

determining that the MIP mode is not used for the current block if the value of the MIP mode parameter indicates that the MIP mode is not used for the current block to determine the intra prediction value of the current block.

9. The method according to claim 7, wherein the parsing the bitstream and determining the MIP mode of the current block comprises:

parsing the bitstream to obtain an MIP mode index number of the current block;

determining the size type of the current block; and determining an MIP mode indicated by the MIP mode index number from a candidate MIP mode list corresponding to the size type as the MIP mode of the current block.

10. The method according to claim 9, further comprising:

constructing the candidate MIP mode list according to 16 MIP modes when the size type of the current block is a first type;

constructing the candidate MIP mode list according to 8 MIP modes when the size type of the current block is a second type;

constructing the candidate MIP mode list according to 6 MIP modes when the size type of the current block is a third type.

11. The method according to claim 10, wherein the determining the size type of the current block comprises:

setting the size type of the current block as the first type when both a width and a height of the current block are equal to 4;

setting the size type of the current block as the second type when both the width and the height of the current block are equal to 8, or the width of the current block is equal to 8 and the height is equal to 4, or the width of the current block is equal to 4 and the height is equal to 8;

setting the size type of the current block as the third type when the width and the height of the current block do not meet the aforementioned conditions.

12. The method according to claim 10, wherein the determining the size type of the current block comprises:

setting the size type of the current block as the first type when both a width and a height of the current block are equal to 4;

setting the size type of the current block as the second type when both the width and the height of the current block are equal to 8 or one of the width and the height of the current block is equal to 4;

setting the size type of the current block as the third type when the width and the height of the current block do not meet the aforementioned conditions.

13. An encoder comprising a first processor and a first memory in which instructions executable for the first processor are stored, and when the instructions are executed by the first processor, the method according to claim 1 is implemented.

14. A decoder comprising a second processor and a second memory in which instructions executable for the second processor are stored, and when the instructions are executed by the second processor, the method according to claim 7 is implemented.

15. A non-transitory computer readable storage medium storing a computer program, wherein the method according to claim 1 is implemented when the computer program is executed by a processor.

16. A non-transitory computer readable storage medium storing a computer program, wherein the method according to claim 7 is implemented when the computer program is executed by a processor.

* * * * *